(12) United States Patent
Li et al.

(10) Patent No.: US 12,493,169 B2
(45) Date of Patent: Dec. 9, 2025

(54) CAMERA LENS GROUP

(71) Applicant: Zhejiang Sunny Optics Co., Ltd, Yuyao (CN)

(72) Inventors: Yang Li, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 809 days.

(21) Appl. No.: 17/193,467

(22) Filed: Mar. 5, 2021

(65) Prior Publication Data
US 2022/0011551 A1 Jan. 13, 2022

(30) Foreign Application Priority Data
Jul. 7, 2020 (CN) .......................... 202010645472.8

(51) Int. Cl.
*G02B 13/18* (2006.01)
*G02B 9/60* (2006.01)
*G02B 13/00* (2006.01)

(52) U.S. Cl.
CPC ........... *G02B 13/0045* (2013.01); *G02B 9/60* (2013.01)

(58) Field of Classification Search
CPC ........ G02B 9/60; G02B 13/0045; G02B 9/00; G02B 13/00; G02B 13/001; G02B 13/0015; G02B 13/002; G02B 13/008; G02B 13/14; G02B 13/143; G02B 13/146; G02B 13/18; G02B 27/0025
USPC .......................... 359/713–717, 764, 763, 770
See application file for complete search history.

(56) References Cited

U.S. PATENT DOCUMENTS

| | | | |
|---|---|---|---|
| 8,780,459 B2* | 7/2014 | Chen | G02B 13/0045 359/767 |
| 8,810,921 B1* | 8/2014 | Tsai | G02B 13/0045 348/340 |
| 9,250,420 B2* | 2/2016 | Hsu | G02B 13/18 |
| 9,784,947 B2* | 10/2017 | Jung | G02B 9/60 |
| 9,791,664 B2* | 10/2017 | Li | G02B 13/14 |
| 9,874,721 B2 | 1/2018 | Mercado | |
| 10,228,537 B2* | 3/2019 | Lai | G02B 13/0045 |
| 2013/0279023 A1 | 10/2013 | Chen | |
| 2016/0231532 A1 | 8/2016 | Huang et al. | |
| 2021/0132334 A1* | 5/2021 | Lin | G02B 9/60 |

FOREIGN PATENT DOCUMENTS

| | | |
|---|---|---|
| CN | 102959449 A | 3/2013 |
| CN | 103472568 A | 12/2013 |
| CN | 104238080 A | 12/2014 |
| CN | 204009194 U | 12/2014 |

(Continued)

OTHER PUBLICATIONS

First Examination Report for Application No. 202114011157, dated Feb. 8, 2022, 5 pages.

*Primary Examiner* — Thong Q Nguyen
(74) *Attorney, Agent, or Firm* — Barnes & Thornburg

(57) ABSTRACT

The present disclosure discloses a camera lens group including, sequentially from an object side to an image side along an optical axis, a first lens, a second lens, a third lens, a fourth lens and a fifth lens. Each of the first to fifth lenses has refractive power. At least one of the first to the fifth lenses has a non-rotationally symmetric aspheric surface. A maximum effective radius DT11 of an object-side surface of the first lens satisfies: DT11<0.80 mm.

15 Claims, 14 Drawing Sheets

(56) References Cited

FOREIGN PATENT DOCUMENTS

| | | | |
|---|---|---|---|
| CN | 105319675 | A | 2/2016 |
| CN | 105842827 | A | 8/2016 |
| CN | 106415350 | A | 2/2017 |
| CN | 106886080 | A | 6/2017 |
| CN | 106886081 | A | 6/2017 |
| CN | 108459391 | A | 8/2018 |
| CN | 108693628 | A | 10/2018 |
| CN | 108931845 | A | 12/2018 |
| CN | 109425965 | A | 3/2019 |
| CN | 109491054 | A  * | 3/2019 |
| CN | 109782418 | A | 5/2019 |
| CN | 110187473 | A | 8/2019 |
| CN | 110297317 | A | 10/2019 |
| CN | 110596865 | A | 12/2019 |
| CN | 110687665 | A | 1/2020 |
| CN | 110727083 | A | 1/2020 |
| CN | 110749980 | A | 2/2020 |
| CN | 110850562 | A | 2/2020 |
| CN | 111025536 | A | 4/2020 |
| CN | 111025539 | A | 4/2020 |
| CN | 210376833 | U | 4/2020 |
| CN | 111158126 | A | 5/2020 |
| CN | 111221106 | A | 6/2020 |
| CN | 111239971 | A | 6/2020 |
| CN | 111323892 | A | 6/2020 |
| WO | 2013058111 | A1 | 4/2013 |
| WO | 2020048157 | | 3/2020 |

* cited by examiner

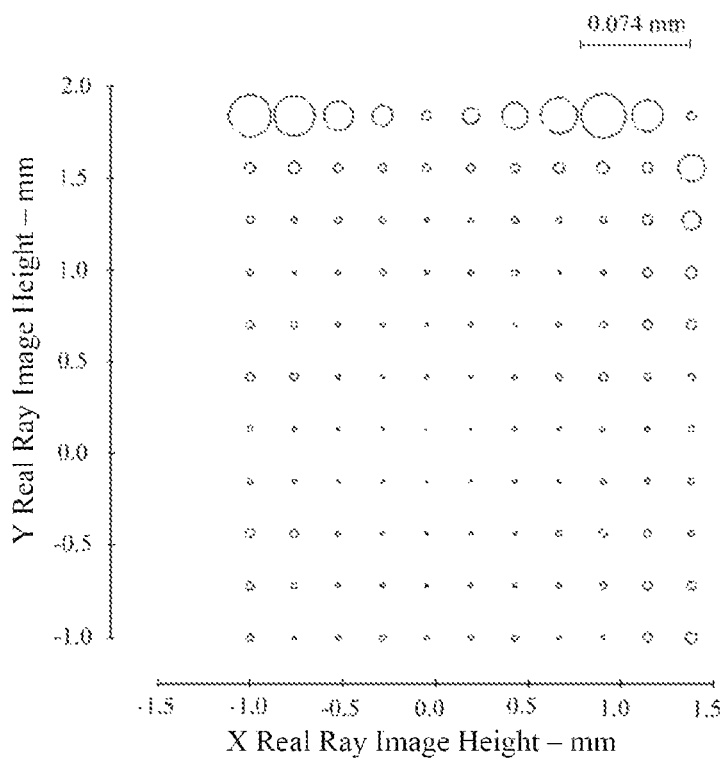
Fig. 5
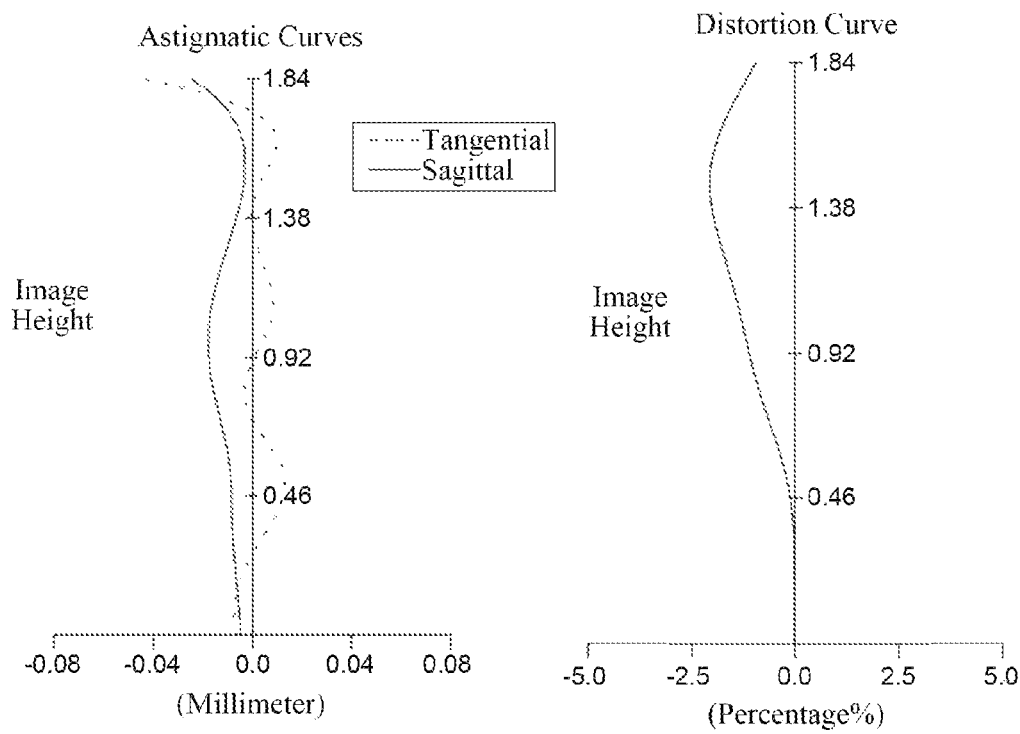
Fig. 6A
Fig. 6B

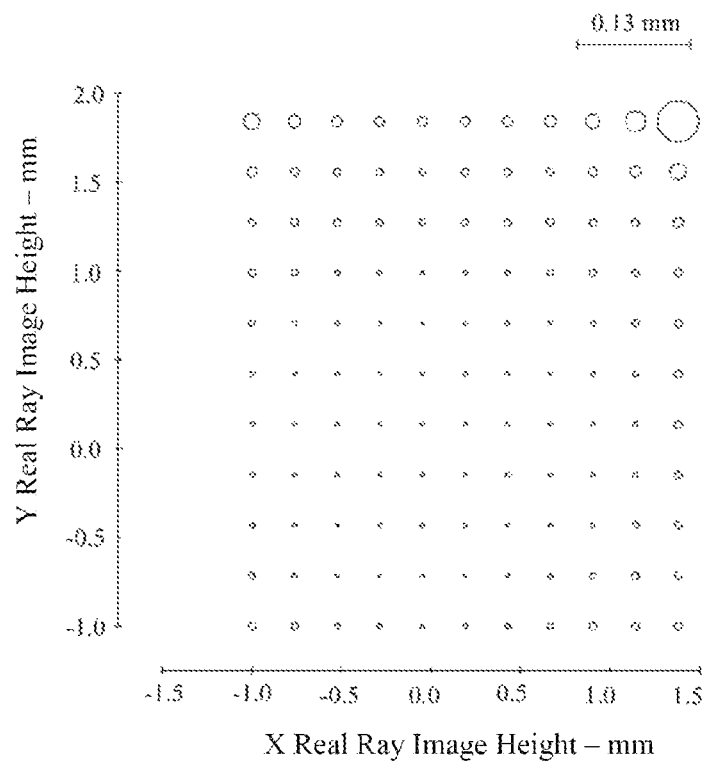
Fig. 11
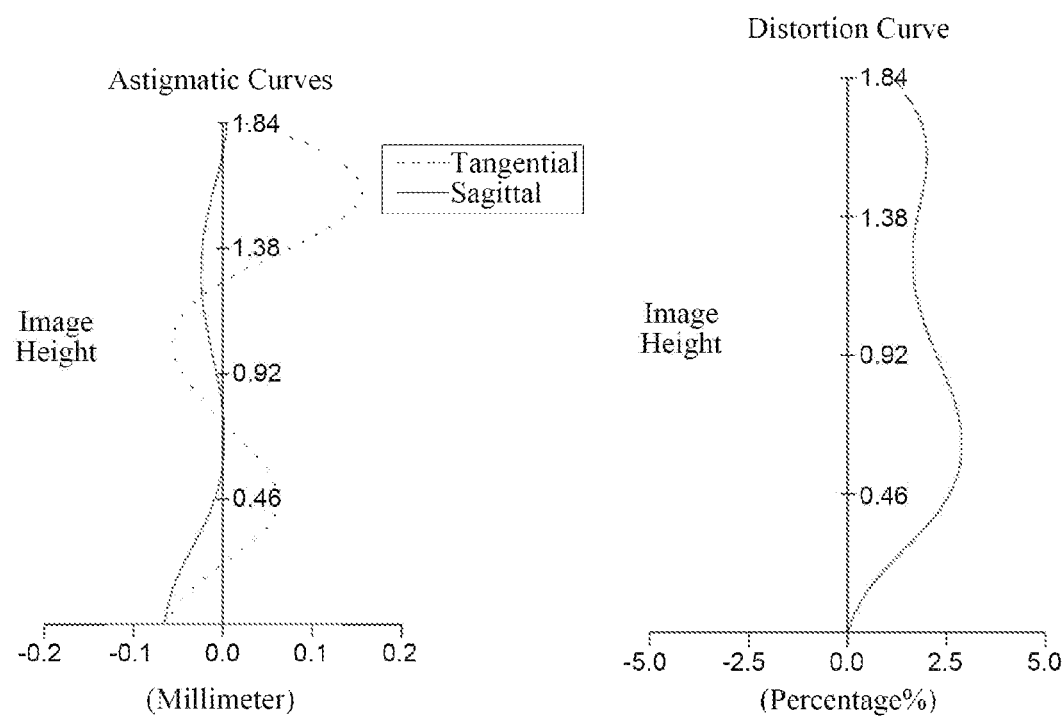
Fig. 12A
Fig. 12B

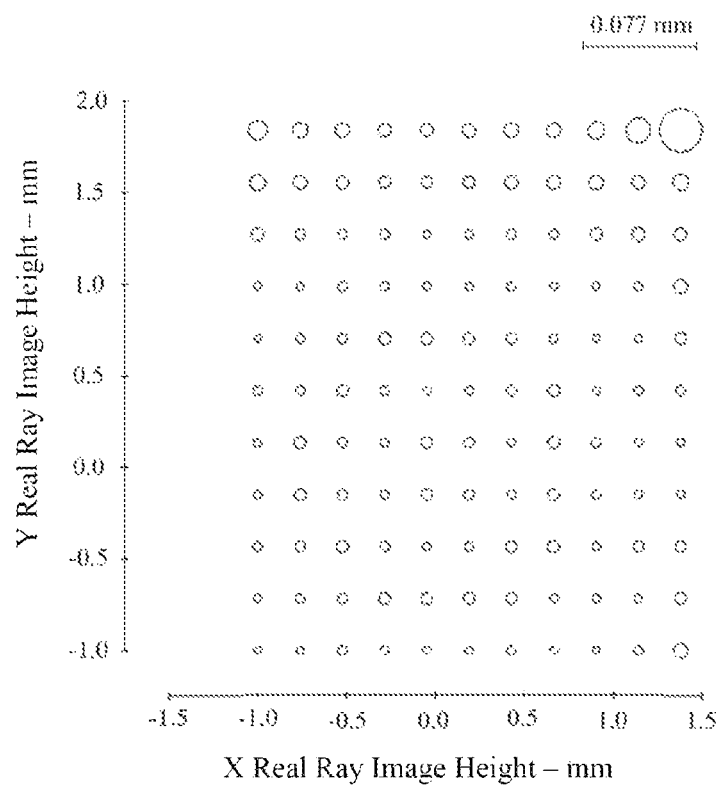
Fig. 17
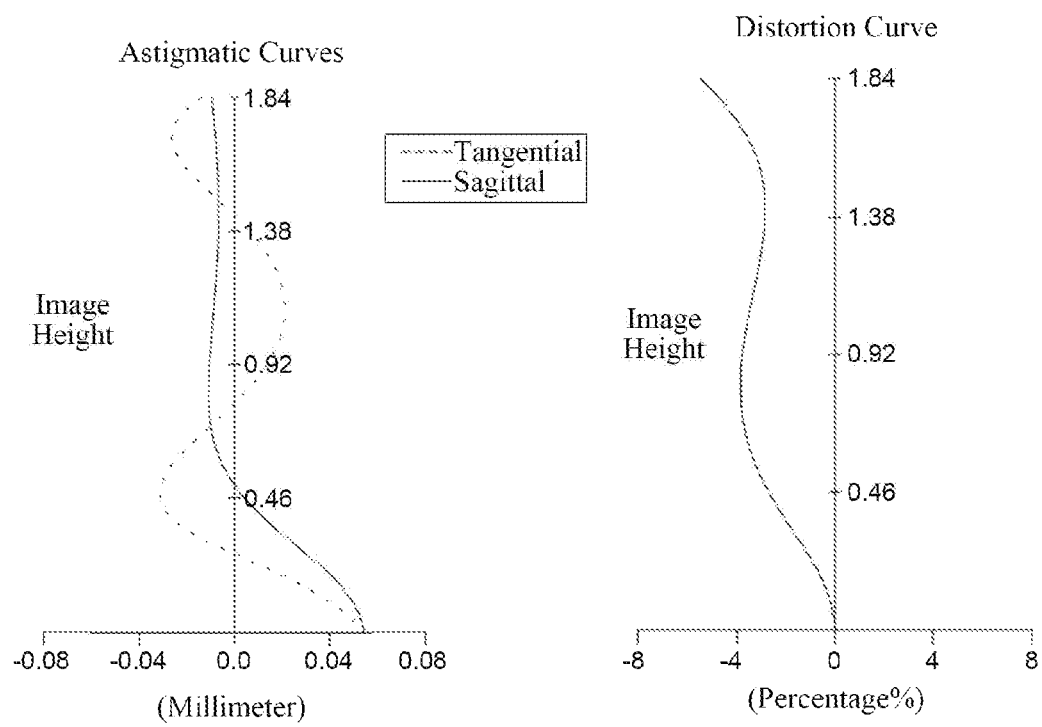
Fig. 18A
Fig. 18B

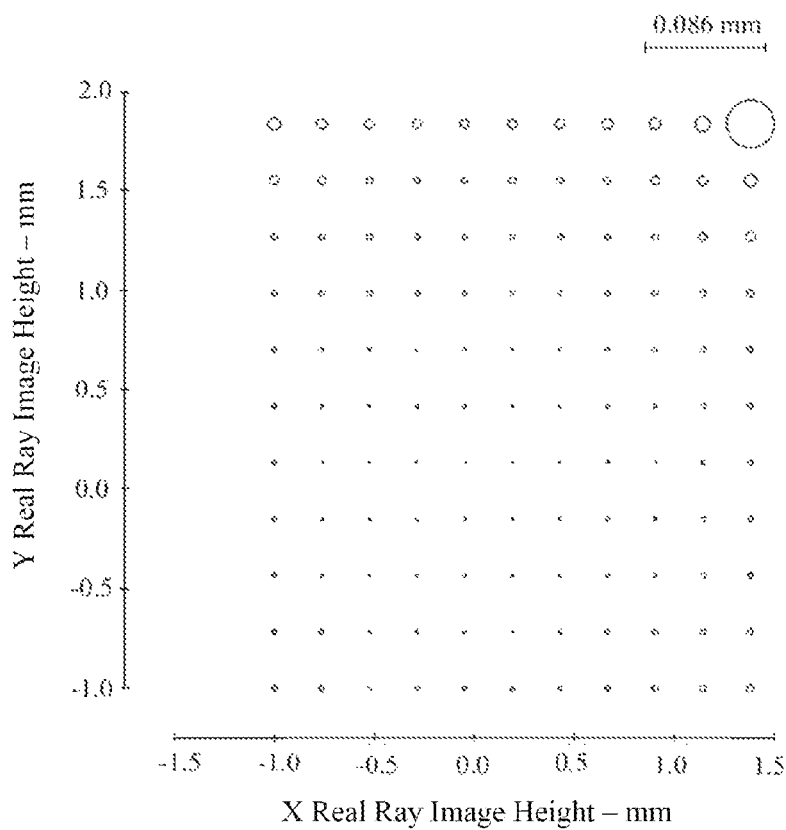
Fig. 23
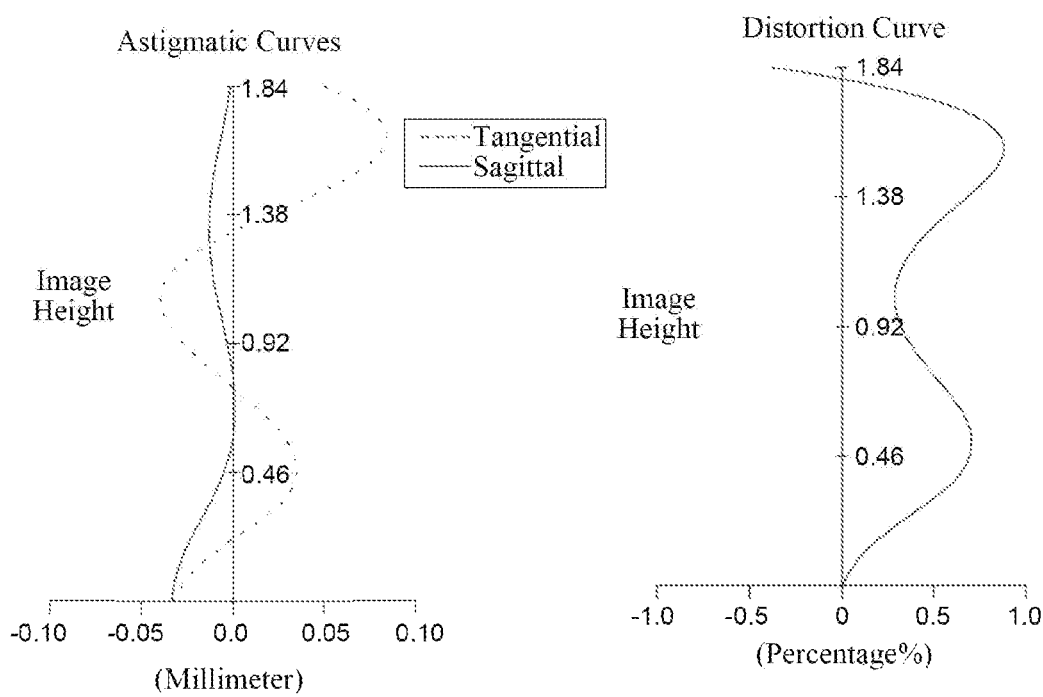
Fig. 24A
Fig. 24B

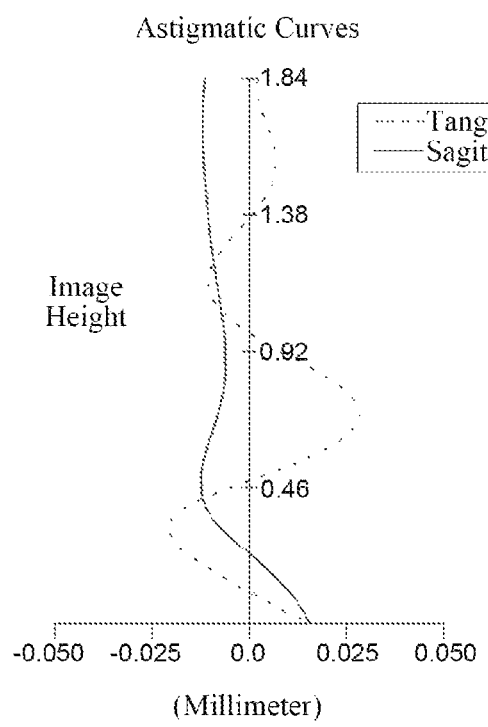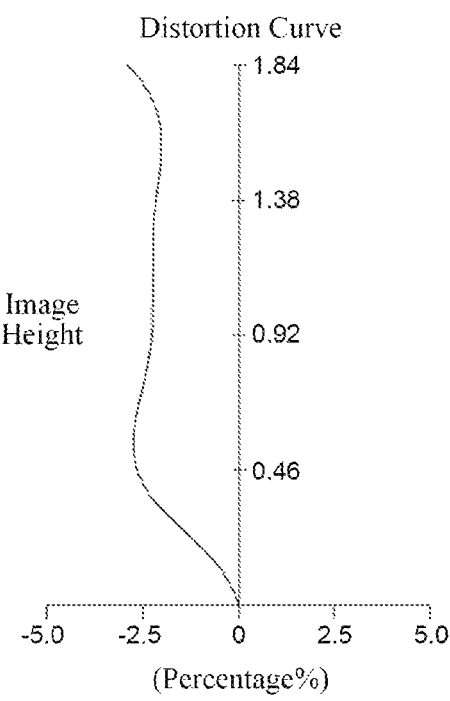
Fig. 27A
Fig. 27B

CAMERA LENS GROUP

CROSS-REFERENCE TO RELATED APPLICATION

This application claims benefit of priority to Chinese Patent Application No. 202010645472.8 filed on Jul. 7, 2020 before the China National Intellectual Property Administration, the entire disclosure of which is incorporated herein by reference in its entity.

TECHNICAL FIELD

The present disclosure relates to the field of optical elements, and specifically, relates to a camera lens group.

BACKGROUND

In recent years, with the continuous development of miniaturized camera lens assemblies and the popularization of large-size and high-pixel chips, major manufacturers of terminal smart device have put forward higher requirements on the performance of camera lens assemblies applicable to smart devices. Since the camera lens groups used in various terminal smart devices mostly adopt rotationally symmetric (i.e., axially symmetric) aspheric lenses, it only has sufficient degrees of freedom in the direction of the tangential image plane, and cannot effectively correct the off-axis aberrations on the tangential image plane and the aberrations on the sagittal image plane.

Free-form surface is a non-rotationally symmetric aspheric surface, which increases the non-rotationally symmetric component, and increases the degree of freedom for optimizing lens performance. The free-form surface may effectively correct the off-axis aberrations on the tangential image plane and the aberrations on the sagittal image plane. For a wide-angle lens assembly, the application of the free-form surface may effectively reduce TV distortion of the lens assembly, which may greatly improve and promote the performance of the camera lens group. Therefore, the application of free-form surfaces to the design and production of the camera lens assemblies will have greater practical significance.

SUMMARY

In one aspect, the present disclosure provides a camera lens group which includes, sequentially from an object side to an image side along an optical axis, a first lens, a second lens, a third lens, a fourth lens and a fifth lens. Each of the first to the fifth lenses has refractive power. At least one of the first to the fifth lenses has a non-rotationally symmetric aspheric surface. A maximum effective radius DT11 of an object-side surface of the first lens may satisfy: DT11<0.80 mm.

In one embodiment, at least one of the object-side surface of the first lens to an image-side surface of the fifth lens is aspheric.

In one embodiment, a combined focal length f23 of the second lens and the third lens and a distance BFL from an image-side surface of the fifth lens to an imaging plane of the camera lens group along the optical axis may satisfy: 2.00<f23/BFL<6.50.

In one embodiment, a combined focal length f12 of the first lens and the second lens and an effective focal length f4 of the fourth lens may satisfy: 1.00<f12/f4<4.00.

In one embodiment, an effective focal length f2 of the second lens and a radius of curvature R9 of an object-side surface of the fifth lens may satisfy: 1.00<f2/R9<4.00.

In one embodiment, a radius of curvature R6 of an image-side surface of the third lens and a radius of curvature R9 of an object-side surface of the fifth lens may satisfy: 0.50<R6/R9<3.00.

In one embodiment, a center thickness CT4 of the fourth lens along the optical axis and a spaced interval T12 between the first lens and the second lens along the optical axis may satisfy: 2.00<CT4/T12<8.00.

In one embodiment, a distance SAG51 along the optical axis from an intersection of an object-side surface of the fifth lens and the optical axis to a vertex of an effective radius of the object-side surface of the fifth lens and a distance SAG22 along the optical axis from an intersection of an image-side surface of the second lens and the optical axis to a vertex of an effective radius of the image-side surface of the second lens may satisfy: 0.50<SAG22/SAG51<3.00.

In one embodiment, an edge thickness ET4 of the fourth lens and an edge thickness ET5 of the fifth lens may satisfy: 1.00<(ET4+ET5)/(ET5−ET4)<5.00.

In one embodiment, the maximum effective radius DT11 of the object-side surface of the first lens and a maximum effective radius DT52 of an image-side surface of the fifth lens may satisfy: 2.00<DT52/DT11<4.00.

In one embodiment, a maximum effective radius DT41 of an object-side surface of the fourth lens and a maximum effective radius DT42 of an image-side surface of the fourth lens may satisfy: 8.00<(DT41+DT42)/(DT42−DT41)<13.00.

In one embodiment, half of a maximum field-of-view Semi-FOV of the camera lens group and a total effective focal length $f$ of the camera lens group may satisfy: 1.00 mm<$\tan^2$(Semi-FOV)*f<4.00 mm.

In another aspect, the present disclosure provides a camera lens group which includes, sequentially from an object side to an image side along an optical axis, a first lens, a second lens, a third lens, a fourth lens and a fifth lens. Each of the first to the fifth lenses has refractive power. At least one of the first to the fifth lenses has a non-rotationally symmetric aspheric surface. A combined focal length f23 of the second lens and the third lens and a distance BFL from an image-side surface of the fifth lens to an imaging plane of the camera lens group along the optical axis may satisfy: 2.00<f23/BFL<6.50.

The present disclosure provides a camera lens group suitable for portable electronic products and having at least one of the characteristics of wide-angle, miniaturization, high pixels, and good image quality through reasonable distribution of refractive power and optimization of optical parameters.

BRIEF DESCRIPTION OF THE DRAWINGS

Other features, objects, and advantages of the present disclosure will become more apparent by reading the detailed description of the non-limiting examples with reference to the accompanying drawings:

FIG. 5 schematically illustrates RMS spot diameters of the camera lens group according to example 2 of the present disclosure in a first quadrant;

FIGS. 6A and 6B illustrate astigmatic curves and a distortion curve of the camera lens group according to example 2 of the present disclosure, respectively;

FIG. 11 schematically illustrates RMS spot diameters of the camera lens group according to example 4 of the present disclosure in a first quadrant;

FIGS. 12A and 12B illustrate astigmatic curves and a distortion curve of the camera lens group according to example 4 of the present disclosure, respectively;

FIG. 17 schematically illustrates RMS spot diameters of the camera lens group according to example 6 of the present disclosure in a first quadrant;

FIGS. 18A and 18B illustrate astigmatic curves and a distortion curve of the camera lens group according to example 6 of the present disclosure, respectively;

FIG. 23 schematically illustrates RMS spot diameters of the camera lens group according to example 8 of the present disclosure in a first quadrant;

FIGS. 24A and 24B illustrate astigmatic curves and a distortion curve of the camera lens group according to example 8 of the present disclosure, respectively;

FIGS. 27A and 27B illustrate astigmatic curves and a distortion curve of the camera lens group according to example 9 of the present disclosure, respectively.

DETAILED DESCRIPTION OF EMBODIMENTS

Figure 1:
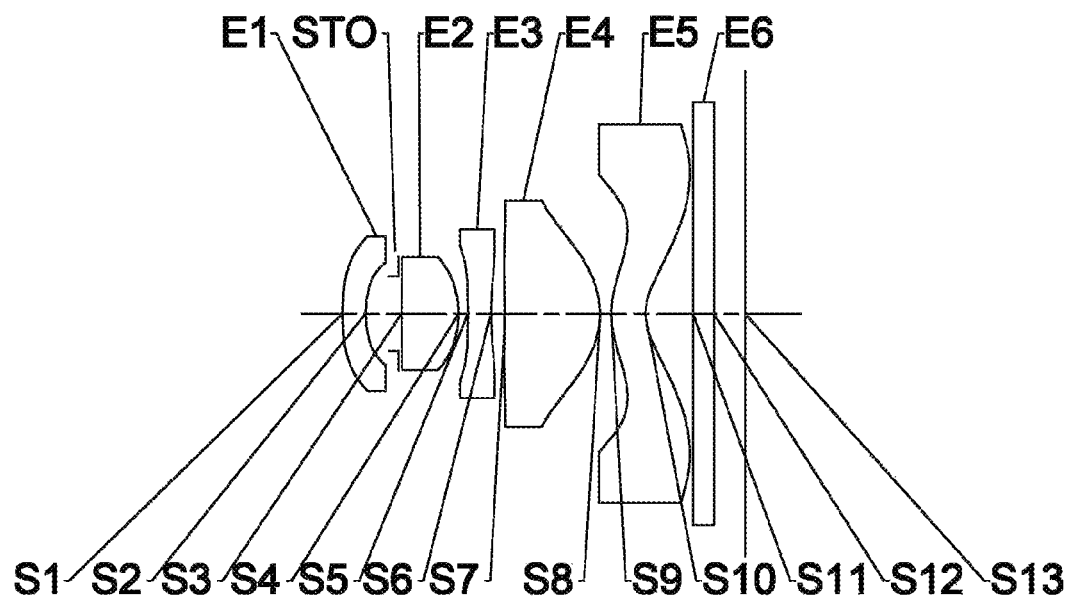
FIG. 1 illustrates a schematic structural view of a camera lens group according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

A camera lens group according to an exemplary embodiment of the present disclosure may include five lenses having refractive power, which are a first lens, a second lens, a third lens, a fourth lens and a fifth lens. The five lenses are arranged sequentially from an object side to an image side along an optical axis. Among the first lens to the fifth lens, there may be a spaced interval between each two adjacent lenses.

In an exemplary embodiment, the camera lens group according to the present disclosure may satisfy: DT11<0.80 mm, where DT11 is a maximum effective radius of an object-side surface of the first lens. When DT11<0.80 mm is satisfied, the size of the front end of the camera lens group may be effectively controlled, making the size of the front end of the lens structural smaller, thereby achieving the characteristics of a small forehead.

In an exemplary embodiment, the camera lens group according to the present disclosure may satisfy: 2.00<f23/BFL<6.50, where f23 is a combined focal length of the second lens and the third lens, and BFL is a distance from an image-side surface of the fifth lens to an imaging plane of the camera lens group along the optical axis. More specifically, f23 and BFL may further satisfy: 2.10<f23/BFL<6.10. When 2.00<f23/BFL<6.50 is satisfied, the aberration of the camera lens group may be reasonably compensated, and the total length of the camera lens group may be effectively controlled, thereby achieving the characteristics of miniaturization.

In an exemplary embodiment, the camera lens group according to the present disclosure may satisfy: 1.00<f12/f4<4.00, where f12 is a combined focal length of the first lens and the second lens, and f4 is an effective focal length of the fourth lens. More specifically, f12 and f4 may further satisfy: 1.20<f12/f4<3.90. When 1.00<f12/f4<4.00 is satisfied, the aberration contributed by the first lens and the second lens may be controlled, and the aberrations generated by the rear lenses of the camera lens group may be compensated to make the overall aberration of the camera lens group at a reasonable level.

In an exemplary embodiment, the camera lens group according to the present disclosure may satisfy: 1.00<f2/R9<4.00, where f2 is an effective focal length of the second lens, and R9 is a radius of curvature of an object-side surface of the fifth lens. More specifically, f2 and R9 may further satisfy: 1.30<f2/R9<3.00. When 1.00<f2/R9<4.00 is satisfied, the refractive power of the camera lens group may be reasonably assigned, and the astigmatic generated by the front optical element and the rear optical element of the camera lens group may be compensated, so that the camera lens group has good image quality.

In an exemplary embodiment, the camera lens group according to the present disclosure may satisfy: 0.50<R6/R9<3.00, where R6 is a radius of curvature of an image-side surface of the third lens, and R9 is a radius of curvature of an object-side surface of the fifth lens. More specifically, R6 and R9 may further satisfy: 1.10<R6/R9<2.90. Satisfying 0.50<R6/R9<3.00 is beneficial to controlling the incident angle of light in the edge field-of-view, thereby reducing the sensitivity of the camera lens group. At the same time, it may better match the camera lens group with the chip.

In an exemplary embodiment, the camera lens group according to the present disclosure may satisfy: 2.00<CT4/T12<8.00, where CT4 is a center thickness of the fourth lens along the optical axis, and T12 is a spaced interval between the first lens and the second lens along the optical axis. More specifically, CT4 and T12 may further satisfy: 2.30<CT4/T12<7.40. When 2.00<CT4/T12<8.00 is satisfied, the sensitivity of this spaced interval to field curvature may be reduced, and the field curvature of the camera lens group may be effectively corrected.

In an exemplary embodiment, the camera lens group according to the present disclosure may satisfy: 0.50<SAG22/SAG51<3.00, where SAG51 is a distance along the optical axis from an intersection of an object-side surface of the fifth lens and the optical axis to a vertex of an effective radius of the object-side surface of the fifth lens, and SAG22 is a distance along the optical axis from an intersection of an image-side surface of the second lens and the optical axis to a vertex of an effective radius of the image-side surface of the second lens. More specifically, SAG22 and SAG51 may further satisfy: 0.70<SAG22/SAG51<3.00. When 0.50<SAG22/SAG51<3.00 is satisfied, the relative tilt angle between the image-side surface of the second lens and the object-side surface of the fifth lens may be effectively controlled, and the risk of ghost images generated between the second lens and the fifth lens may be reduced.

In an exemplary embodiment, the camera lens group according to the present disclosure may satisfy: 1.00<(ET4+ET5)/(ET5−ET4)<5.00, where ET4 is an edge thickness of the fourth lens, and ET5 is an edge thickness of the fifth lens. More specifically, ET4 and ET5 may further satisfy: 1.80<(ET4+ET5)/(ET5−ET4)<4.80. When 1.00<(ET4+ET5)/(ET5−ET4)<5.00 is satisfied, the thickness ratio of the fourth lens and the fifth lens may be reasonably controlled to prevent the problem of over-thickness or over-thinness, thereby ensuring the processability of the lens.

In an exemplary embodiment, the camera lens group according to the present disclosure may satisfy: 2.00<DT52/DT11<4.00, where DT11 is a maximum effective radius of an object-side surface of the first lens, and DT52 is a maximum effective radius of an image-side surface of the fifth lens. More specifically, DT52 and DT11 may further satisfy: 2.30<DT52/DT11<3.30. When 2.00<DT52/DT11<4.00 is satisfied, the aperture of the camera lens group may be reasonably controlled, and the characteristics of miniaturization of the camera lens group may be achieved.

In an exemplary embodiment, the camera lens group according to the present disclosure may satisfy: 8.00<(DT41+DT42)/(DT42−DT41)<13.00, where DT41 is a maximum effective radius of an object-side surface of the fourth lens, and DT42 is a maximum effective radius of an image-side surface of the fourth lens. More specifically, DT41 and DT42 may further satisfy: 8.60<(DT41+DT42)/(DT42−DT41)<12.90. 8.00<(DT41+DT42)/(DT42−DT41)<13.00 is satisfied. On the one hand, the size of the camera lens group may be reduced, thereby making the entire camera lens group lighter and thinner. On the other hand, the range of incident light may be reasonably limited, such that the light at edge filed of view with poor quality may be eliminated to reduce the off-axis aberrations and effectively improve the resolution of the camera lens group.

In an exemplary embodiment, the camera lens group according to the present disclosure may satisfy: 1.00 mm<$\tan^2$(Semi-FOV)*f<4.00 mm, where Semi-FOV is half of a maximum field-of-view of the camera lens group, and ƒ is a total effective focal length of the camera lens group. More specifically, Semi-FOV and ƒ may further satisfy: 1.90 mm<$\tan^2$(Semi-FOV)*f<3.30 mm. Satisfying 1.00 mm<$\tan^2$(Semi-FOV)*f<4.00 mm may effectively make wide-angle lens assembly have a sense of spatial depth.

In an exemplary embodiment, the camera lens group according to the present disclosure further includes a stop disposed between the first lens and the second lens. Optionally, the above camera lens group may further include an optical filter for correcting the color deviation and/or a protective glass for protecting the photosensitive element located on an imaging plane. The present disclosure proposes a camera lens group with wide-angle, high-pixel, miniaturization and other characteristics, and the camera lens group has aspheric surfaces and free-form surface(s). The camera lens group according to the above embodiments of the present disclosure may employ a plurality of lenses, such as five lenses as described above. By properly configuring the refractive power of each lens, the surface shape, the center thickness of each lens, and spaced intervals along the optical axis between the lenses, the size of the camera lens group may be effectively reduced, and the workability of the camera lens group may be improved, such that the camera lens group is more advantageous for production processing.

In the embodiments of the present disclosure, at least one of the surfaces of lenses is aspheric, that is, at least one of the object-side surface of the first lens to the image-side surface of the fifth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens and the fifth lens is aspheric. Optionally, the object-side surface and the image-side surface of each of the first lens, the second lens, the third lens, the fourth lens and the fifth lens are aspheric.

However, it will be understood by those skilled in the art that the number of lenses constituting the camera lens group may be varied to achieve the various results and advantages described in this specification without departing from the technical solution claimed by the present disclosure. For example, although the embodiment is described by taking five lenses as an example, the camera lens group is not limited to include five lenses. The camera lens group may also include other numbers of lenses if desired.

Some specific examples of a camera lens group applicable to the above embodiment will be further described below with reference to the accompanying drawings.

EXAMPLE 1

A camera lens group according to example 1 of the present disclosure is described below with reference to FIG. 1 to FIG. 3B. FIG. 1 shows a schematic structural view of the camera lens group according to example 1 of the present disclosure.

As shown in FIG. 1, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

Table 1 is a table illustrating basic parameters of the camera lens group of example 1, wherein the units for the radius of curvature, the thickness/distance and the focal length in the first direction perpendicular to the optical axis are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ |  | Infinite | Infinite |  |  |  |  |
| S1 | Aspheric | 26.9781 | 0.2300 | 1.55 | 56.1 | −34.92 | −99.0000 |
| S2 | Aspheric | 11.1368 | 0.0911 |  |  |  | 26.2641 |
| STO |  | Infinite | 0.0195 |  |  |  |  |
| S3 | Aspheric | 29.5376 | 0.4817 | 1.55 | 56.1 | 2.89 | −99.0000 |
| S4 | Aspheric | −1.6565 | 0.0300 |  |  |  | −0.0217 |
| S5 | Aspheric | 2.6529 | 0.2300 | 1.67 | 20.4 | −5.44 | 6.0678 |
| S6 | Aspheric | 1.4798 | 0.2272 |  |  |  | 1.6708 |
| S7 | Aspheric | −7.1447 | 0.8127 | 1.55 | 56.1 | 1.34 | 73.3491 |
| S8 | Aspheric | −0.6897 | 0.0595 |  |  |  | −0.9538 |
| S9(AAS) | Aspheric | 1.2966 | 0.3462 | 1.62 | 23.5 | −2.12 | −1.0054 |
| S10(AAS) | Aspheric | 0.4404 | 0.4643 |  |  |  | −2.2646 |
| S11 |  | Infinite | 0.2100 | 1.52 | 64.2 |  |  |
| S12 |  | Infinite | 0.4116 |  |  |  |  |
| S13 |  | Infinite |  |  |  |  |  |

In this example, a total effective focal length f of the camera lens group is 1.84 mm, a total length TTL of the camera lens group (that is, a distance along the optical axis from the object-side surface S1 of the first lens E1 to the imaging plane S13 of the camera lens group) is 3.61 mm, half of a diagonal length ImgH of an effective pixel area on the imaging plane S13 of the camera lens group is 1.84 mm, half of a maximum field-of-view Semi-FOV of the camera lens group is 45.8°, and an aperture value Fno of the camera lens group is 2.24.

In example 1, the object-side surface and the image-side surface of any one of the first lens E1 to the fourth lens E4 are rotationally symmetric aspheric. The surface shape x of each rotationally symmetric aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; $A_i$ is a correction coefficient for the i-th order of the aspheric surface. Table 2 below shows high-order coefficients A4, A6, A8, A10, A12, A14, A16, A18 and A20 applicable to each rotationally symmetrical aspheric surface S1 to S8 in example 1.

TABLE 2

| Surface number | A4 | A6 | A8 | A10 | A12 |
|---|---|---|---|---|---|
| S1 | 8.0897E−02 | −2.6688E−03 | −1.1913E−04 | −6.0210E−05 | −8.6857E−06 |
| S2 | 5.1727E−02 | 1.8262E−04 | 1.9506E−04 | −3.5081E−05 | 8.9675E−06 |
| S3 | 1.0864E−02 | −1.6140E−03 | 5.4197E−05 | −9.1776E−06 | 1.1285E−06 |
| S4 | −1.0123E−01 | −9.2447E−03 | −4.7503E−03 | −1.1473E−04 | −1.4498E−04 |
| S5 | −1.1747E−01 | 1.2937E−02 | −4.1706E−03 | 2.8510E−04 | −1.2217E−04 |
| S6 | −1.3177E−01 | 1.1516E−03 | −3.6463E−03 | −1.0768E−03 | −3.6343E−04 |
| S7 | 9.9490E−02 | 2.5160E−03 | 2.5314E−03 | 1.2622E−04 | 2.6101E−04 |
| S8 | 6.1034E−01 | −1.4675E+00 | 3.9831E+00 | −1.3155E+01 | 3.6368E+01 |

| Surface number | A14 | A16 | A18 | A20 |
|---|---|---|---|---|
| S1 | −1.3732E−05 | −6.2501E−07 | −5.7240E−06 | −2.1582E−06 |
| S2 | −8.1513E−06 | 6.3037E−06 | −1.0478E−06 | 6.0047E−06 |
| S3 | 3.1199E−06 | −2.3707E−07 | −9.6893E−08 | −1.0279E−07 |
| S4 | 3.6109E−04 | 1.3048E−04 | 1.1006E−04 | 3.8231E−05 |
| S5 | 4.5453E−04 | 7.4759E−05 | 1.2922E−04 | 1.4855E−05 |
| S6 | −1.0313E−04 | −4.9592E−05 | −7.9371E−06 | 1.1792E−05 |
| S7 | 2.3682E−04 | 7.1432E−05 | 5.4528E−05 | 4.6978E−07 |
| S8 | −6.4026E+01 | 6.6503E+01 | −3.6886E+01 | 8.3586E+00 |

In example 1, the object-side surface S9 and the image-side surface S10 of the fifth lens E5 are non-rotationally symmetrical aspheric surfaces (i.e., AAS surface). The surface shape of non-rotationally symmetric aspheric surface may be defined by using, but not limited to, the following aspheric formula for non-rotationally symmetric surface:

$$z = \frac{cr^2}{1+\sqrt{1-(1+k)c^2r^2}} + \sum_{j=1}^{66} C_{(j+1)}ZP_j, \text{ where,} \quad (2)$$

$$r = \sqrt{x^2+y^2} \quad (3)$$

Where, z is a sagittal height of the lens surface parallel to the optical axis; c is a curvature of the vertex of the non-rotationally symmetric aspheric surface, k is a conic coefficient; r is a radius value; $ZP_j$ is the j-th Zernike polynomial; $C_{(J+1)}$ is the coefficient of $ZP_j$. In the AAS surface coefficient list of example 1, the Zernike terms range from $ZP_1$ to $ZP_{66}$, with corresponding SCO coefficients C2 to C67, and SCO coefficients that are not shown are all zero. Table 3-1 to Table 3-3 below show the Zernike polynomial coefficients C2, C5, C6, C12, C13, C14, C23, C24, C25, C26, C38, C39, C40, C41, C42, C57, C58, C59, C60, C61 and C62 applicable to non-rotationally symmetric aspheric surfaces S9 and S10 in example 1.

TABLE 3-1

| AAS SURFACE | C2 | C5 | C6 | C12 | C13 | C14 | C23 |
|---|---|---|---|---|---|---|---|
| S9  | −3.4260E−01 | −4.8015E−03 | −4.4224E−01 | −1.1763E−02 | −6.1317E−03 | −9.8006E−02 | −2.9962E−02 |
| S10 | −5.9159E−01 | −7.1073E−02 | −6.4101E−01 | −1.1327E−01 | −7.0762E−02 | −1.1076E−01 | −1.3369E−01 |

TABLE 3-2

| AAS SURFACE | C24 | C25 | C26 | C38 | C39 | C40 | C41 |
|---|---|---|---|---|---|---|---|
| S9  | −8.3905E−03 | −6.4508E−03 | 2.8314E−02 | −1.5684E−02 | −1.6743E−02 | −3.0066E−03 | −3.7626E−03 |
| S10 | −6.8503E−02 | −4.7398E−02 | −3.2504E−02 | −7.2232E−02 | −5.7787E−02 | −2.5312E−02 | −1.8901E−02 |

TABLE 3-3

| AAS SURFACE | C42 | C57 | C58 | C59 | C60 | C61 | C62 |
|---|---|---|---|---|---|---|---|
| S9  | −2.5009E−03 | −2.0687E−02 | −6.8024E−03 | −3.1525E−03 | −5.6997E−04 | −8.8375E−04 | 3.1601E−04 |
| S10 | −2.0956E−02 | −7.6221E−02 | −2.1681E−02 | −8.9065E−03 | −4.8759E−03 | −3.1778E−03 | −2.9851E−03 |

Figure 2:
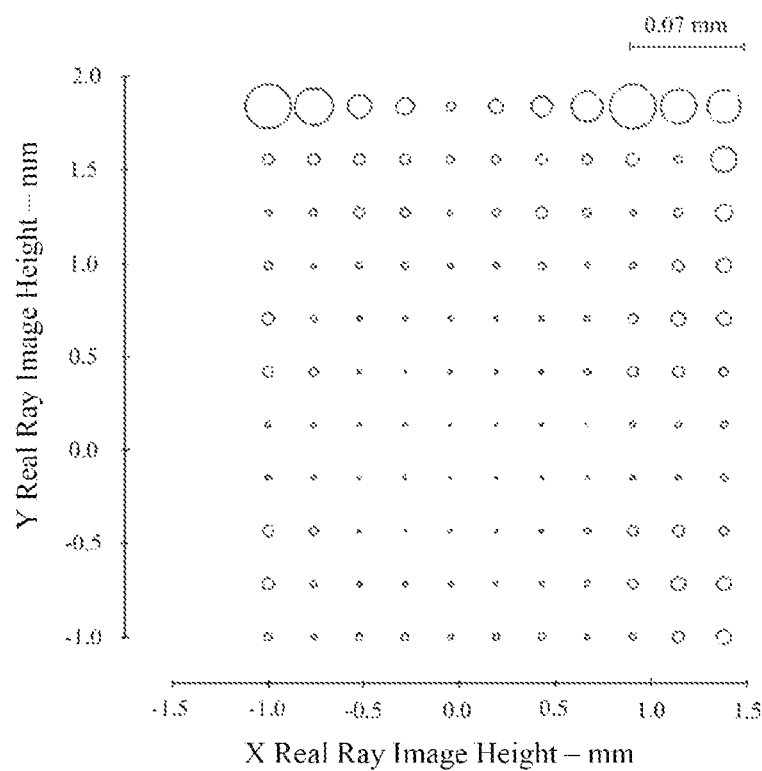
FIG. 2 schematically illustrates RMS spot diameters of the camera lens group according to example 1 of the present disclosure in a first quadrant.
Figures 3A, 3B:
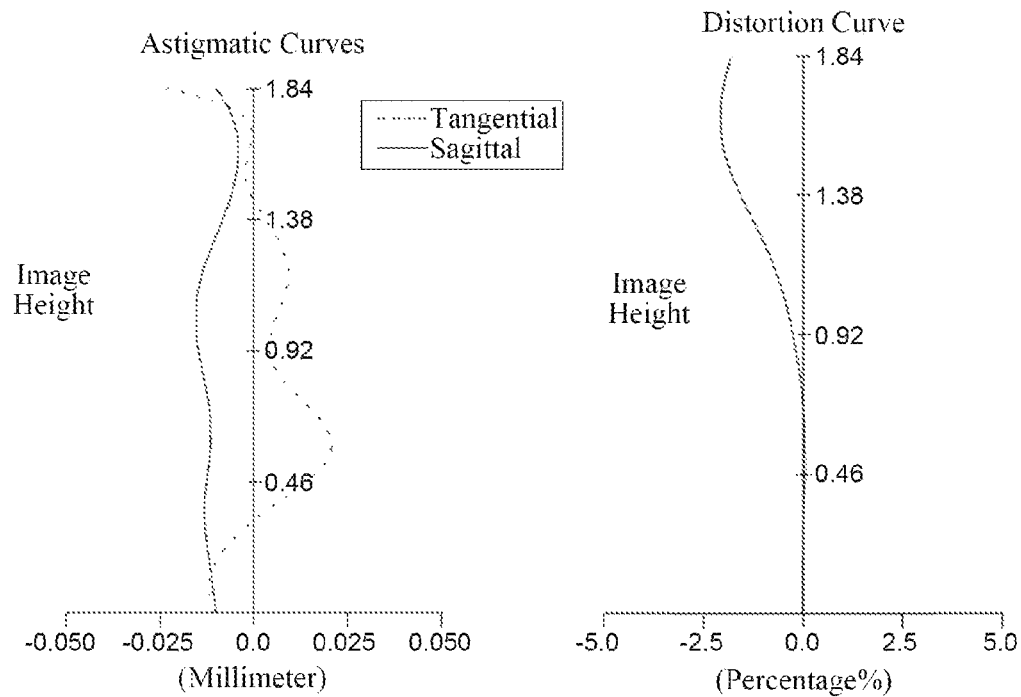
FIGS. 3A and 3B illustrate astigmatic curves and a distortion curve of the camera lens group according to example 1 of the present disclosure, respectively.

FIG. 2 illustrates the sizes of the RMS spot diameters of the camera lens group according to example 1 at positions with different image heights in a first quadrant. FIG. 2 illustrates a relationship between the RMS spot diameter and the real ray image height. In FIG. 2, each grid of the coordinate axis corresponds to 0.07 mm, the smallest RMS spot diameter is 0.0011332 mm, the largest RMS spot diameter is 0.027907 mm, the average RMS spot diameter is 0.0056 mm, and the standard deviation of the RMS spot diameter is 0.0048517 mm FIG. 3A illustrates astigmatic curves of the camera lens group according to example 1, representing the curvatures of a tangential plane and the curvatures of a sagittal plane. FIG. 3B illustrates a distortion curve of the camera lens group according to example 1, representing the amounts of distortion corresponding to different image heights. It can be seen from FIG. 2 to FIG. 3B that the camera lens group provided in example 1 may achieve good image quality.

EXAMPLE 2

Figure 4:
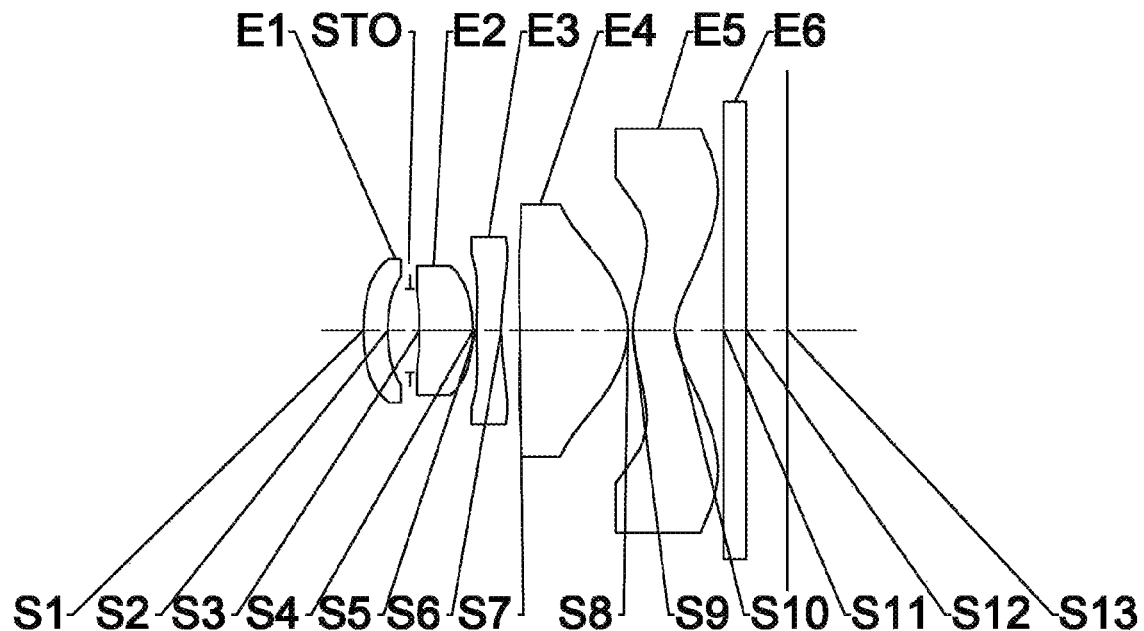
FIG. 4 illustrates a schematic structural view of a camera lens group according to example 2 of the present disclosure.

A camera lens group according to example 2 of the present disclosure is described below with reference to FIG. 4 to FIG. 6B. In this example and the following examples, for the purpose of brevity, the description of parts similar to those in example 1 will be omitted. FIG. 4 shows a schematic structural view of the camera lens group according to example 2 of the present disclosure.

As shown in FIG. 4, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.62 mm, a total length TTL of the camera lens group is 3.54 mm, half of a diagonal length ImgH of an effective pixel area on the imaging plane S13 of the camera lens group is 1.84 mm, half of a maximum field-of-view Semi-FOV of the camera lens group is 49.1°, and an aperture value Fno of the camera lens group is 2.24.

Table 4 is a table illustrating basic parameters of the camera lens group of example 2, wherein the units for the radius of curvature, the thickness/distance and the focal length in the first direction perpendicular to the optical axis are millimeter (mm). Table 5 shows high-order coefficients applicable to each rotationally symmetric aspheric surface in example 2, wherein the surface shape of each rotationally symmetric aspheric surface may be defined by the formula (1) given in the above example 1. Table 6-1 to Table 6-3 each shows Zernike polynomial coefficients applicable to non-rotationally symmetric aspheric surface in example 2, wherein the surface shape of non-rotationally symmetric aspheric surface may be defined by the formulas (2) and (3) given in the above example 1.

TABLE 4

| Surface number | Surface type | Radius of curvature | Thickness/ Distance | Refractive index | Abbe number | Focal length | Conic coefficient |
|---|---|---|---|---|---|---|---|
| OBJ | | Infinite | Infinite | | | | |
| S1 | Aspheric | 7.9766 | 0.2302 | 1.55 | 56.1 | −10.89 | 99.0000 |
| S2 | Aspheric | 3.3714 | 0.1046 | | | | 44.4318 |
| STO | | Infinite | 0.0258 | | | | |
| S3 | Aspheric | 9.9374 | 0.4916 | 1.55 | 56.1 | 2.25 | −22.7827 |
| S4 | Aspheric | −1.3745 | 0.0300 | | | | 0.4423 |
| S5 | Aspheric | 4.0761 | 0.2330 | 1.67 | 20.4 | −4.21 | 2.8855 |
| S6 | Aspheric | 1.6254 | 0.2069 | | | | 1.7151 |
| S7 | Aspheric | −7.0498 | 0.8584 | 1.55 | 56.1 | 1.25 | 73.6345 |
| S8 | Aspheric | −0.6489 | 0.0663 | | | | −0.9325 |
| S9(AAS) | Aspheric | 1.3735 | 0.3399 | 1.62 | 23.5 | −2.08 | −1.2634 |
| S10(AAS) | Aspheric | 0.4133 | 0.4163 | | | | −2.0765 |
| S11 | | Infinite | 0.2100 | 1.52 | 64.2 | | |
| S12 | | Infinite | 0.3294 | | | | |
| S13 | | Infinite | | | | | |

TABLE 5

| Surface number | A4 | A6 | A8 | A10 | A12 |
|---|---|---|---|---|---|
| S1 | 7.7337E−02 | −3.6058E−03 | −3.4684E−04 | −2.2827E−04 | 3.9798E−05 |
| S2 | 4.9820E−02 | 5.0788E−04 | 3.2249E−04 | 1.1368E−04 | 1.8775E−04 |
| S3 | 1.1479E−02 | −1.2369E−03 | 7.3061E−05 | −2.9338E−05 | −2.9919E−05 |
| S4 | −8.5748E−02 | −5.1911E−03 | −2.8115E−03 | 2.3068E−05 | −6.3325E−04 |
| S5 | −1.0027E−01 | 1.1011E−02 | −2.4249E−03 | −4.2079E−05 | −8.5124E−04 |

TABLE 5-continued

| | | | | | |
|---|---|---|---|---|---|
| S6 | −1.2592E−01 | 3.7752E−03 | −3.0240E−03 | −7.8286E−04 | −4.1825E−04 |
| S7 | 7.9749E−02 | 3.5526E−03 | 2.5014E−03 | −1.0596E−04 | 6.8494E−04 |
| S8 | 5.9808E−01 | −1.4753E+00 | 3.9763E+00 | −1.3161E+01 | 3.6368E+01 |

| Surface number | A14 | A16 | A18 | A20 |
|---|---|---|---|---|
| S1 | 3.3157E−06 | 3.1840E−05 | 9.0047E−06 | −1.2274E−06 |
| S2 | 1.0349E−04 | 5.8192E−05 | 7.7699E−06 | 2.8694E−06 |
| S3 | 2.1330E−05 | 2.7619E−05 | 1.1576E−05 | 1.2425E−06 |
| S4 | −2.0404E−05 | 4.7643E−05 | 3.2738E−05 | 2.3980E−05 |
| S5 | −1.3159E−04 | −2.5056E−05 | −7.3214E−06 | 1.4570E−05 |
| S6 | −2.9932E−04 | −2.4287E−05 | −5.0942E−05 | 6.8568E−06 |
| S7 | 1.9902E−04 | 1.5678E−04 | 6.5505E−05 | 2.2738E−05 |
| S8 | −6.4024E+01 | 6.6505E+01 | −3.6884E+01 | 8.3595E+00 |

TABLE 6-1

| AAS SURFACE | C2 | C5 | C6 | C12 | C13 | C14 | C23 |
|---|---|---|---|---|---|---|---|
| S9 | −2.7777E−01 | 3.8872E−04 | −4.3427E−01 | −5.4893E−03 | −1.0780E−03 | −1.1395E−01 | −2.6266E−02 |
| S10 | −5.7326E−01 | −6.4568E−02 | −6.7579E−01 | −7.6313E−02 | −6.7738E−02 | −1.1811E−01 | −1.3334E−01 |

TABLE 6-2

| AAS SURFACE | C24 | C25 | C26 | C38 | C39 | C40 | C41 |
|---|---|---|---|---|---|---|---|
| S9 | −1.2507E−02 | −4.2179E−03 | 2.3885E−02 | −1.7701E−02 | −1.6968E−02 | −6.3490E−03 | −3.9365E−03 |
| S10 | −8.3485E−02 | −5.4240E−02 | −3.7333E−02 | −7.7458E−02 | −7.5348E−02 | −4.0029E−02 | −2.8526E−02 |

TABLE 6-3

| AAS SURFACE | C42 | C57 | C58 | C59 | C60 | C61 | C62 |
|---|---|---|---|---|---|---|---|
| S9 | −2.4832E−03 | −2.2093E−02 | −7.9663E−03 | −2.7525E−03 | −1.5098E−03 | −1.3431E−03 | 1.7324E−03 |
| S10 | −1.8356E−02 | −9.4759E−02 | −2.9985E−02 | −1.1668E−02 | −8.9661E−03 | −6.9726E−03 | −3.9066E−03 |

FIG. 5 illustrates the sizes of RMS spot diameters of the camera lens group according to example 2 at positions with different image heights in a first quadrant. FIG. 5 illustrates a relationship between the RMS spot diameter and the real ray image height. In FIG. 5, each grid of the coordinate axis corresponds to 0.074 mm, the smallest RMS spot diameter is 0.0008001 mm, the largest RMS spot diameter is 0.029593 mm, the average RMS spot diameter is 0.005332 mm, and the standard deviation of the RMS spot diameter is 0.0052757 mm FIG. 6A illustrates astigmatic curves of the camera lens group according to example 2, representing the curvatures of a tangential plane and the curvatures of a sagittal plane. FIG. 6B illustrates a distortion curve of the camera lens group according to example 2, representing the amounts of distortion corresponding to different image heights. It can be seen from FIG. 5 to FIG. 6B that the camera lens group provided in example 2 may achieve good image quality.

EXAMPLE 3

Figure 7:
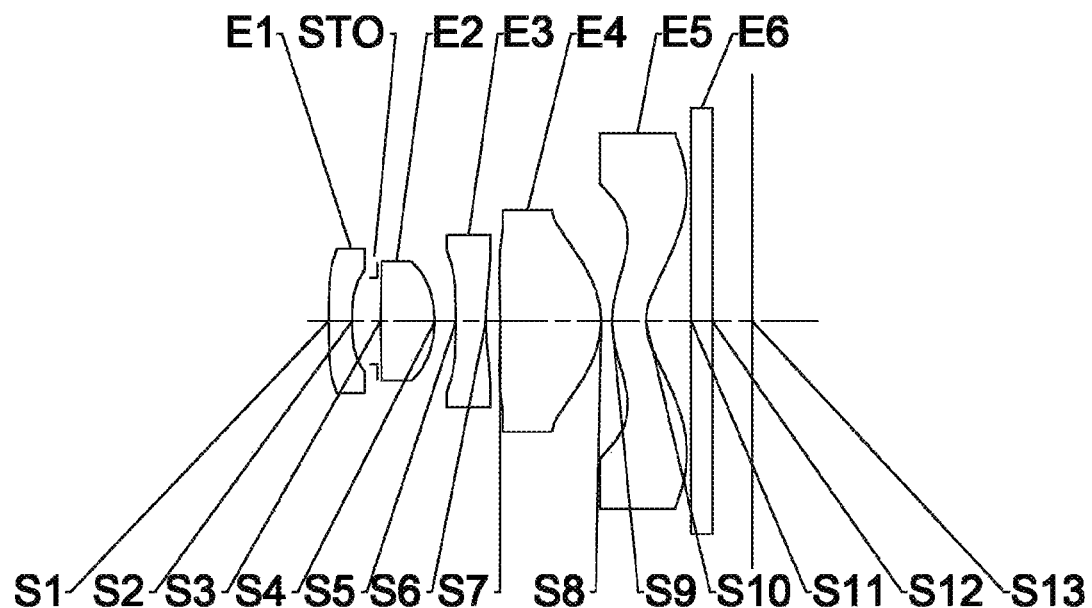
FIG. 7 illustrates a schematic structural view of a camera lens group according to example 3 of the present disclosure.

A camera lens group according to example 3 of the present disclosure is described below with reference to FIG. 7 to FIG. 9B. FIG. 7 shows a schematic structural view of the camera lens group according to example 3 of the present disclosure.

As shown in FIG. 7, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.68 mm, a total length TTL of the camera lens group is 4.03 mm, half of a diagonal length ImgH of an effective pixel area on the imaging plane S13 of the camera lens group is 1.84 mm, half of a maximum field-of-view Semi-FOV of the camera lens group is 54.1°, and an aperture value Fno of the camera lens group is 2.22.

Table 7 is a table illustrating basic parameters of the camera lens group of example 3, wherein the units for the radius of curvature, the thickness/distance and the focal length in the first direction perpendicular to the optical axis are millimeter (mm). Table 8 shows high-order coefficients applicable to each rotationally symmetric aspheric surface in example 3, wherein the surface shape of each rotationally symmetric aspheric surface may be defined by the formula (1) given in the above example 1. Table 9-1 to Table 9-3 each shows Zernike polynomial coefficients applicable to non-rotationally symmetric aspheric surface in example 3, wherein the surface shape of non-rotationally symmetric aspheric surface may be defined by the formulas (2) and (3) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | | Infinite | Infinite | | | | |
| S1 | Aspheric | 3.3872 | 0.2300 | 1.55 | 56.1 | −4.03 | 15.1045 |
| S2 | Aspheric | 1.3022 | 0.3283 | | | | 2.7311 |
| STO | | Infinite | 0.0300 | | | | |
| S3 | Aspheric | 8.9321 | 0.5719 | 1.55 | 56.1 | 1.69 | −62.1383 |
| S4 | Aspheric | −1.0039 | 0.0921 | | | | −0.6930 |
| S5 | Aspheric | 28.8668 | 0.2300 | 1.67 | 20.4 | −3.97 | 99.0000 |
| S6 | Aspheric | 2.4179 | 0.1431 | | | | 2.3323 |
| S7 | Aspheric | −7.7510 | 0.9531 | 1.54 | 55.9 | 1.63 | 60.9923 |
| S8 | Aspheric | −0.8178 | 0.1066 | | | | −0.9938 |
| S9 | Aspheric | 0.8705 | 0.3422 | 1.62 | 23.5 | −2.68 | −1.5076 |
| S10(AAS) | Aspheric | 0.5157 | 0.4763 | | | | −3.4050 |
| S11 | | Infinite | 0.2100 | 1.52 | 64.2 | | |
| S12 | | Infinite | 0.3121 | | | | |
| S13 | | Infinite | | | | | |

TABLE 8

| Surface number | A4 | A6 | A8 | A10 | A12 |
|---|---|---|---|---|---|
| S1 | 5.7819E−01 | −1.5481E+00 | 1.0289E+01 | −5.4219E+01 | 1.9174E+02 |
| S2 | 1.0873E+00 | −7.4310E+00 | 1.4317E+02 | −1.6523E+03 | 1.2275E+04 |
| S3 | −1.0220E−01 | 6.5403E−01 | −2.7337E+01 | 3.9542E+02 | −3.6908E+03 |
| S4 | −3.6157E−01 | −2.8362E−01 | 7.2043E+00 | −6.6964E+01 | 2.9165E+02 |
| S5 | −6.0152E−01 | −1.2462E−01 | 1.2661E+01 | −9.8588E+01 | 4.2628E+02 |
| S6 | −3.7513E−01 | −5.9614E−01 | 7.6476E+00 | −3.3858E+01 | 8.9315E+01 |
| S7 | 2.5301E−01 | −6.8245E−01 | 1.1150E+00 | 1.6743E+00 | −1.1408E+01 |
| S8 | 7.8637E−02 | 1.1368E−01 | −3.6799E−01 | 1.9434E−01 | 1.0611E+00 |
| S9 | −6.6706E−01 | 7.3875E−01 | −9.5502E−01 | 1.0480E+00 | −8.4283E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |
| S8 | −2.5347E+00 | 2.5960E+00 | −1.2818E+00 | 2.4294E−01 |
| S9 | 4.2344E−01 | −1.1756E−01 | 1.6017E−02 | −8.8994E−04 |

TABLE 9-1

| AAS SURFACE | C2 | C5 | C6 | C12 | C13 | C14 | C23 |
|---|---|---|---|---|---|---|---|
| S10 | −2.5834E−01 | 1.8375E−06 | −3.5565E−01 | 3.0436E−05 | 2.5991E−06 | −6.8041E−02 | 2.7111E−06 |

TABLE 9-2

| AAS SURFACE | C24 | C25 | C26 | C38 | C39 | C40 | C41 |
|---|---|---|---|---|---|---|---|
| S10 | 3.2540E−05 | 2.8000E−06 | 2.1268E−02 | 7.5925E−06 | 2.3664E−06 | 2.8058E−05 | 2.4440E−06 |

TABLE 9-3

| AAS SURFACE | C42 | C57 | C58 | C59 | C60 | C61 | C62 |
|---|---|---|---|---|---|---|---|
| S10 | −3.9869E−03 | 1.5716E−06 | 4.7354E−06 | 1.6257E−06 | 1.8872E−05 | 1.6789E−06 | 5.0257E−03 |

Figure 8:
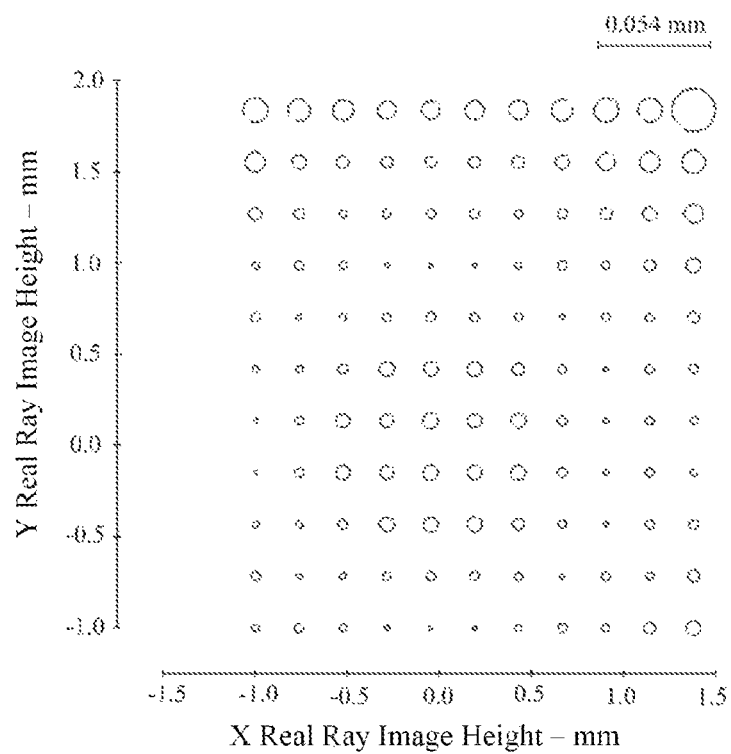
FIG. 8 schematically illustrates RMS spot diameters of the camera lens group according to example 3 of the present disclosure in a first quadrant.
Figures 9A, 9B:
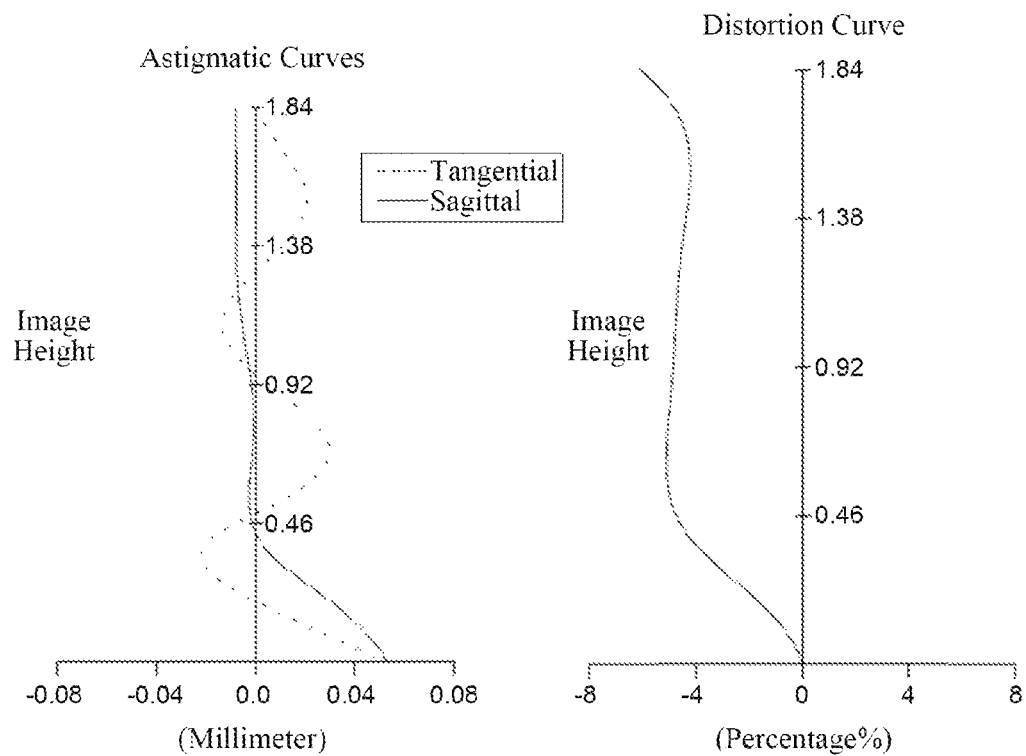
FIGS. 9A and 9B illustrate astigmatic curves and a distortion curve of the camera lens group according to example 3 of the present disclosure, respectively.

FIG. 8 illustrates the sizes of RMS spot diameters of the camera lens group according to example 3 at positions with different image heights in a first quadrant. FIG. 8 illustrates a relationship between the RMS spot diameter and the real ray image height. In FIG. 8, each grid of the coordinate axis corresponds to 0.054 mm, the smallest RMS spot diameter is 0.0021797 mm, the largest RMS spot diameter is 0.021193 mm, the average RMS spot diameter is 0.0055252 mm, and the standard deviation of the RMS spot diameter is 0.0027496 mm FIG. 9A illustrates astigmatic curves of the camera lens group according to example 3, representing the curvatures of a tangential plane and the curvatures of a sagittal plane. FIG. 9B illustrates a distortion curve of the camera lens group according to example 3, representing the amounts of distortion corresponding to different image heights. It can be seen from FIG. 8 to FIG. 9B that the camera lens group provided in example 3 may achieve good image quality.

EXAMPLE 4

Figure 10:
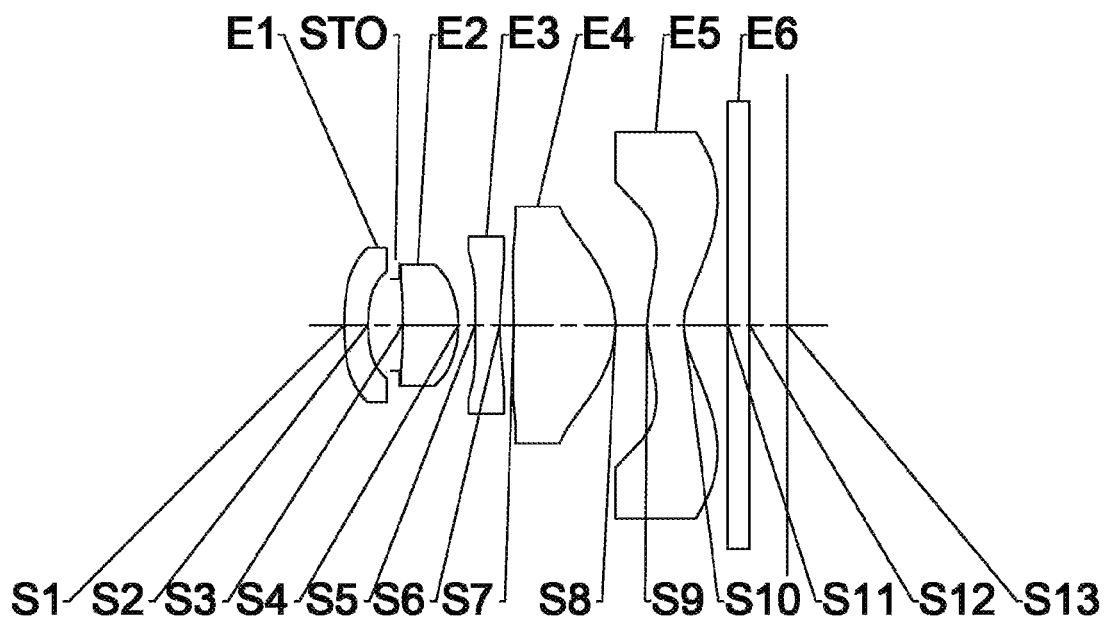
FIG. 10 illustrates a schematic structural view of a camera lens group according to example 4 of the present disclosure.

A camera lens group according to example 4 of the present disclosure is described below with reference to FIG. 10 to FIG. 12B. FIG. 10 shows a schematic structural view of the camera lens group according to example 4 of the present disclosure.

As shown in FIG. 10, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has positive refractive power, an object-side surface S1 thereof is convex, and an image-side surface S2 thereof is concave. The second lens E2 has positive refractive power, an object-side surface S3 thereof is concave, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.77 mm, a total length TTL of the camera lens group is 3.97 mm, half of a diagonal length ImgH of an effective pixel area on the imaging plane S13 of the camera lens group is 1.84 mm, half of a maximum field-of-view Semi-FOV of the camera lens group is 47.1°, and an aperture value Fno of the camera lens group is 2.22.

Table 10 is a table illustrating basic parameters of the camera lens group of example 4, wherein the units for the radius of curvature, the thickness/distance and the focal length in the first direction perpendicular to the optical axis are millimeter (mm). Table 11 shows high-order coefficients applicable to each rotationally symmetric aspheric surface in example 4, wherein the surface shape of each rotationally symmetric aspheric surface may be defined by the formula (1) given in the above example 1. Table 12-1 to Table 12-3 show Zernike polynomial coefficients applicable to non-rotationally symmetric aspheric surface in example 4, wherein the surface shape of non-rotationally symmetric aspheric surface may be defined by the formulas (2) and (3) given in the above example 1.

TABLE 10

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | | Infinite | Infinite | | | | |
| S1 | Aspheric | 1.9211 | 0.2300 | 1.55 | 56.1 | 2000.00 | 1.6712 |
| S2 | Aspheric | 1.8432 | 0.2109 | | | | −3.4006 |
| STO | | Infinite | 0.0850 | | | | |

TABLE 10-continued

| Surface number | Surface type | Radius of curvature | Thickness/ Distance | Material Refractive index | Abbe number | Focal length | Conic coefficient |
|---|---|---|---|---|---|---|---|
| S3 | Aspheric | −4.8179 | 0.5036 | 1.55 | 56.1 | 2.96 | 98.8601 |
| S4 | Aspheric | −1.2554 | 0.0300 | | | | −1.4130 |
| S5 | Aspheric | 4.6258 | 0.2300 | 1.67 | 20.4 | −5.24 | 28.5114 |
| S6 | Aspheric | 1.9522 | 0.1748 | | | | 1.7109 |
| S7(AAS) | Aspheric | −7.9594 | 1.0092 | 1.54 | 55.9 | 1.48 | 0.0000 |
| S8(AAS) | Aspheric | −0.7774 | 0.0471 | | | | −0.6077 |
| S9 | Aspheric | 1.0062 | 0.3910 | 1.62 | 23.5 | −2.51 | −1.6483 |
| S10 | Aspheric | 0.5258 | 0.4592 | | | | −2.6594 |
| S11 | | Infinite | 0.2100 | 1.52 | 64.2 | | |
| S12 | | Infinite | 0.3858 | | | | |
| S13 | | Infinite | | | | | |

TABLE 11

| Surface number | A4 | A6 | A8 | A10 | A12 |
|---|---|---|---|---|---|
| S1 | 4.2192E−01 | −9.5142E−01 | 9.5061E+00 | −5.2322E+01 | 1.9174E+02 |
| S2 | 9.8218E−01 | −8.1986E+00 | 1.4770E+02 | −1.6692E+03 | 1.2275E+04 |
| S3 | −6.6104E−02 | 4.6498E−01 | −2.4717E+01 | 3.8852E+02 | −3.6908E+03 |
| S4 | −3.2819E−01 | −3.2003E−01 | 7.0889E+00 | −6.7238E+01 | 2.9165E+02 |
| S5 | −5.7563E−01 | −1.6244E−01 | 1.2420E+01 | −9.8509E+01 | 4.2628E+02 |
| S6 | −4.1222E−01 | −6.3032E−01 | 7.6492E+00 | −3.3883E+01 | 8.9315E+01 |
| S9 | −6.4859E−01 | 7.5130E−01 | −9.5354E−01 | 1.0469E+00 | −8.4363E−01 |
| S10 | −3.7453E−01 | 4.5559E−01 | −4.3796E−01 | 3.1062E−01 | −1.5763E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S9 | 4.2312E−01 | −1.1762E−01 | 1.6043E−02 | −8.5023E−04 |
| S10 | 5.4362E−02 | −1.1962E−02 | 1.5098E−03 | −8.3053E−05 |

TABLE 12-1

| AAS SURFACE | C2 | C5 | C6 | C12 | C13 | C14 | C23 |
|---|---|---|---|---|---|---|---|
| S7 | 3.0015E−02 | 1.0066E−06 | 4.0248E−02 | 1.8573E−05 | 1.6694E−06 | 7.9182E−03 | 2.2457E−06 |
| S8 | 1.8429E−01 | −5.7260E−07 | 3.0553E−01 | −1.3241E−05 | −1.1826E−06 | 1.5243E−01 | −2.1039E−06 |

TABLE 12-2

| AAS SURFACE | C24 | C25 | C26 | C38 | C39 | C40 | C41 |
|---|---|---|---|---|---|---|---|
| S7 | 2.5087E−05 | 2.3196E−06 | −3.0084E−03 | 5.4913E−06 | 2.8578E−06 | 3.0685E−05 | 2.9516E−06 |
| S8 | −2.1895E−05 | −2.1733E−06 | 4.1533E−02 | −1.3251E−06 | −3.6586E−06 | −3.4304E−05 | −3.7788E−06 |

TABLE 12-3

| AAS SURFACE | C42 | C57 | C58 | C59 | C60 | C61 | C62 |
|---|---|---|---|---|---|---|---|
| S7 | −1.5393E−03 | 3.3319E−06 | 4.6653E−06 | 3.4468E−06 | 3.5111E−05 | 3.5596E−06 | −8.7680E−04 |
| S8 | 1.0776E−02 | −5.9234E−06 | 2.4898E−06 | −6.1276E−06 | −5.2156E−05 | −6.3282E−06 | −2.4095E−04 |

FIG. 11 illustrates the sizes of RMS spot diameters of the camera lens group according to example 4 at positions with different image heights in a first quadrant. FIG. 11 illustrates a relationship between the RMS spot diameter and the real ray image height. In FIG. 11, each grid of the coordinate axis corresponds to 0.13 mm, the smallest RMS spot diameter is 0.0041433 mm, the largest RMS spot diameter is 0.050041 mm, the average RMS spot diameter is 0.007907 mm, and the standard deviation of the RMS spot diameter is 0.005189 mm. FIG. 12A illustrates astigmatic curves of the camera lens group according to example 4, representing the curvatures of a tangential plane and the curvatures of a sagittal plane. FIG. 12B illustrates a distortion curve of the camera lens group according to example 4, representing the amounts of distortion corresponding to different image heights. It can be seen from FIG. 11 to FIG. 12B that the camera lens group provided in example 4 may achieve good image quality.

EXAMPLE 5

Figure 13:
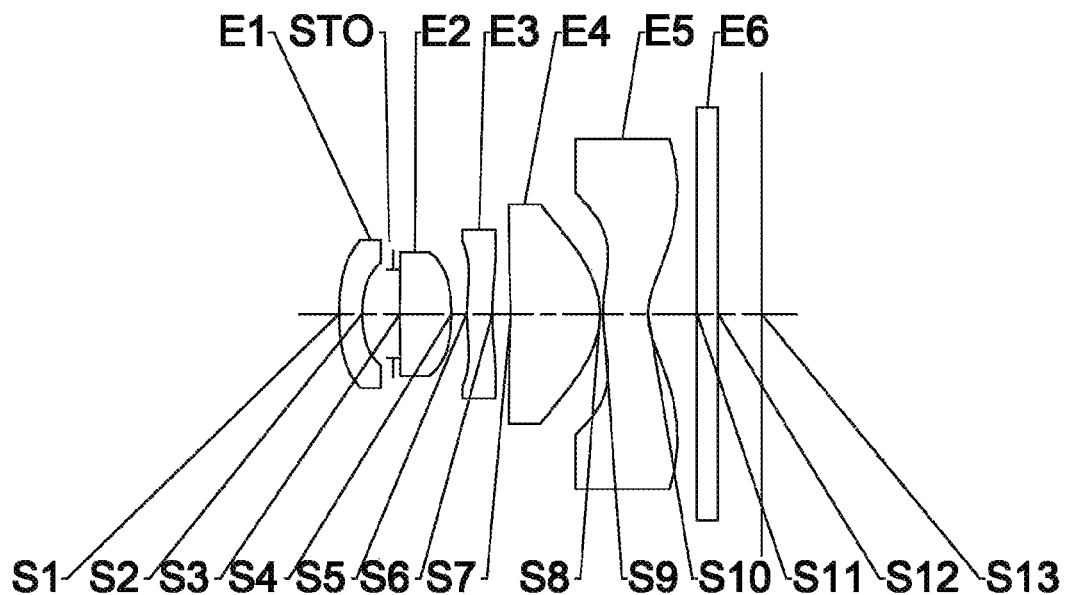
FIG. 13 illustrates a schematic structural view of a camera lens group according to example 5 of the present disclosure.

A camera lens group according to example 5 of the present disclosure is described below with reference to FIG. 13 to FIG. 15B. FIG. 13 shows a schematic structural view of the camera lens group according to example 5 of the present disclosure.

As shown in FIG. 13, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is concave, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.77 mm, a total length TTL of the camera lens group is 4.15 mm, half of a diagonal length ImgH of an effective pixel area on the imaging plane S13 of the camera lens group is 1.84 mm, half of a maximum field-of-view Semi-FOV of the camera lens group is 46.8°, and an aperture value Fno of the camera lens group is 2.22.

Table 13 is a table illustrating basic parameters of the camera lens group of example 5, wherein the units for the radius of curvature, the thickness/distance and the focal length in the first direction perpendicular to the optical axis are millimeter (mm). Table 14 shows high-order coefficients applicable to each rotationally symmetric aspheric surface in example 5, wherein the surface shape of each rotationally symmetric aspheric surface may be defined by the formula (1) given in the above example 1. Table 15-1 to Table 15-3 show Zernike polynomial coefficients applicable to non-rotationally symmetric aspheric surface in example 5, wherein the surface shape of non-rotationally symmetric aspheric surface may be defined by the formulas (2) and (3) given in the above example 1.

TABLE 13

| Surface number | Surface type | Radius of curvature | Thickness/ Distance | Material Refractive index | Material Abbe number | Focal length | Conic coefficient |
|---|---|---|---|---|---|---|---|
| OBJ | | Infinite | Infinite | | | | |
| S1 | Aspheric | −10.0000 | 0.2300 | 1.55 | 56.1 | −3.91 | 83.1295 |
| S2 | Aspheric | 2.7373 | 0.2467 | | | | 10.3254 |
| STO | Spherical | Infinite | 0.0300 | | | | |
| S3 | Aspheric | 6.0202 | 0.5357 | 1.55 | 56.1 | 1.63 | −4.7683 |
| S4 | Aspheric | −1.0135 | 0.2057 | | | | −0.6896 |
| S5 | Aspheric | 31.4176 | 0.2934 | 1.67 | 20.4 | −3.44 | −99.0000 |
| S6(AAS) | Aspheric | 2.1753 | 0.1404 | | | | 0.0053 |
| S7 | Aspheric | −7.7541 | 0.9915 | 1.54 | 55.9 | 1.67 | 60.1542 |
| S8 | Aspheric | −0.8415 | 0.1035 | | | | −1.0789 |
| S9 | Aspheric | 0.9017 | 0.3343 | 1.62 | 23.5 | −3.06 | −1.3518 |
| S10 | Aspheric | 0.5287 | 0.4441 | | | | −2.4456 |
| S11 | Spherical | Infinite | 0.2100 | 1.52 | 64.2 | | |
| S12 | Spherical | Infinite | 0.3885 | | | | |
| S13 | Spherical | Infinite | | | | | |

TABLE 14

| Surface number | A4 | A6 | A8 | A10 | A12 |
|---|---|---|---|---|---|
| S1 | 7.5623E−01 | −1.8247E+00 | 1.0210E+01 | −5.3948E+01 | 1.9174E+02 |
| S2 | 1.3458E+00 | −7.4870E+00 | 1.3963E+02 | −1.6427E+03 | 1.2275E+04 |
| S3 | −4.2150E−02 | 1.1310E+00 | −3.1060E+01 | 4.0650E+02 | −3.6908E+03 |
| S4 | −3.5358E−01 | −3.8734E−01 | 7.2384E+00 | −6.6547E+01 | 2.9165E+02 |
| S5 | −6.2481E−01 | −2.1485E−01 | 1.2688E+01 | −9.8233E+01 | 4.2628E+02 |
| S7 | 2.7367E−01 | −6.6445E−01 | 1.1138E+00 | 1.6613E+00 | −1.1393E+01 |
| S8 | 9.0218E−02 | 1.0356E−01 | −3.6943E−01 | 1.9890E−01 | 1.0672E+00 |
| S9 | −6.8223E−01 | 7.3559E−01 | −9.5278E−01 | 1.0481E+00 | −8.4316E−01 |
| S10 | −3.8951E−01 | 4.4948E−01 | −4.3391E−01 | 3.1091E−01 | −1.5772E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S7 | 2.3692E+01 | −2.5872E+01 | 1.4950E+01 | −3.6110E+00 |
| S8 | −2.5289E+00 | 2.5939E+00 | −1.2818E+00 | 2.4294E−01 |
| S9 | 4.2330E−01 | −1.1758E−01 | 1.6041E−02 | −8.6593E−04 |
| S10 | 5.4332E−02 | −1.1967E−02 | 1.5098E−03 | −8.2684E−05 |

TABLE 15-1

| AAS SURFACE | C2 | C5 | C6 | C12 | C13 | C14 | C23 |
|---|---|---|---|---|---|---|---|
| S6 | −4.7634E−02 | 1.8000E−08 | −6.5799E−02 | 3.1897E−07 | 2.9285E−08 | −1.5349E−02 | 3.8259E−08 |

TABLE 15-2

| AAS SURFACE | C24 | C25 | C26 | C38 | C39 | C40 | C41 |
|---|---|---|---|---|---|---|---|
| S6 | 4.1896E−07 | 3.9517E−08 | 2.2048E−03 | 7.6856E−08 | 4.6779E−08 | 4.9274E−07 | 4.8314E−08 |

TABLE 15-3

| AAS SURFACE | C42 | C57 | C58 | C59 | C60 | C61 | C62 |
|---|---|---|---|---|---|---|---|
| S6 | −3.4073E−04 | 5.1794E−08 | 5.8162E−08 | 5.3579E−08 | 5.3481E−07 | 5.5333E−08 | 3.2101E−04 |

Figure 14:
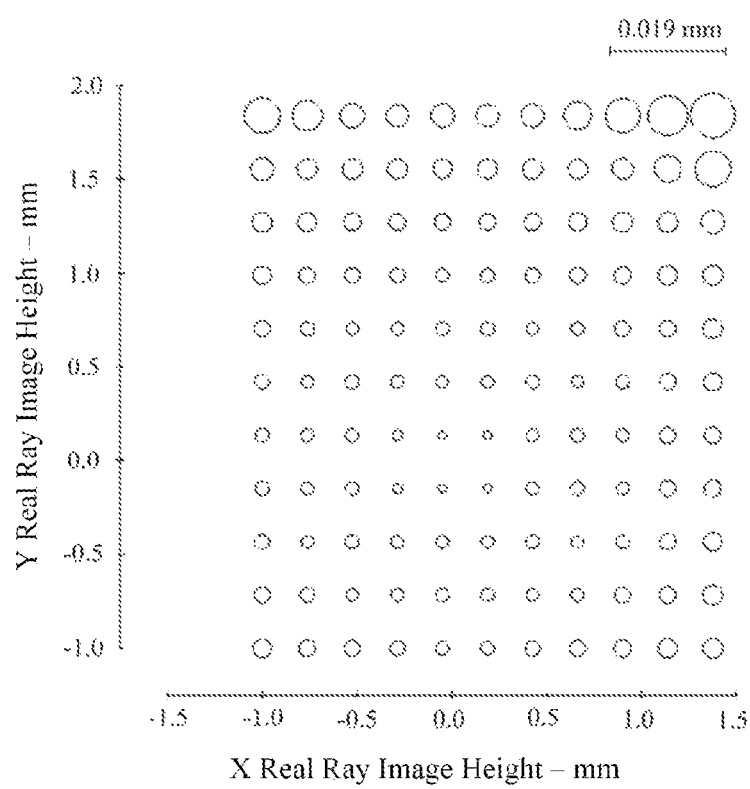
FIG. 14 schematically illustrates RMS spot diameters of the camera lens group according to example 5 of the present disclosure in a first quadrant.
Figure 15A:
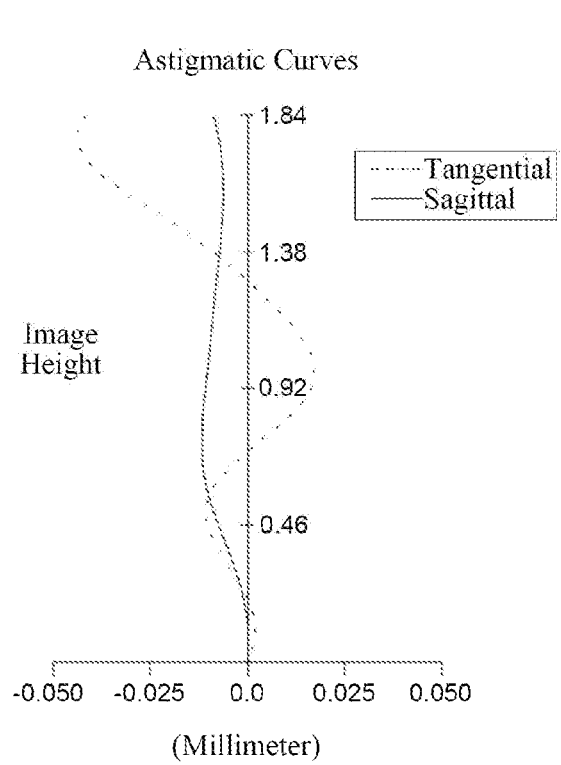
FIGS. 15A and 15B illustrate astigmatic curves and a distortion curve of the camera lens group according to example 5 of the present disclosure, respectively.
Figure 15B:
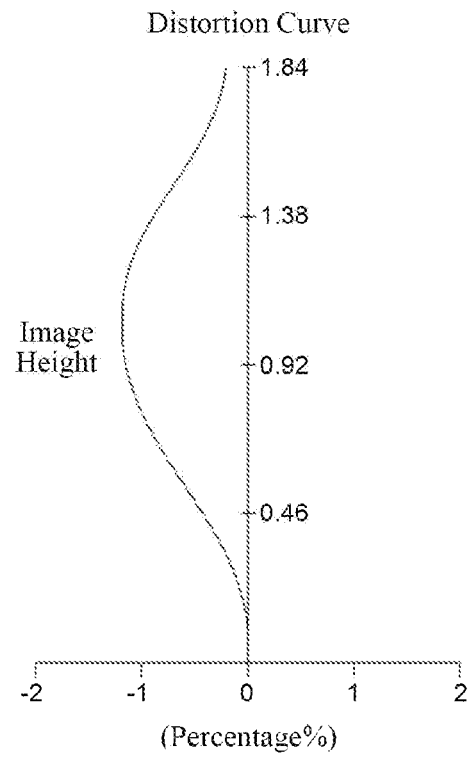

FIG. 14 illustrates the sizes of RMS spot diameters of the camera lens group according to example 5 at positions with different image heights in a first quadrant. FIG. 14 illustrates a relationship between the RMS spot diameter and the real ray image height. In FIG. 14, each grid of the coordinate axis corresponds to 0.019 mm, the smallest RMS spot diameter is 0.0013346 mm, the largest RMS spot diameter is 0.0074958 mm, the average RMS spot diameter is 0.002831 mm, and the standard deviation of the RMS spot diameter is 0.00099759 mm. FIG. 15A illustrates astigmatic curves of the camera lens group according to example 5, representing the curvatures of a tangential plane and the curvatures of a sagittal plane. FIG. 15B illustrates a distortion curve of the camera lens group according to example 5, representing the amounts of distortion corresponding to different image heights. It can be seen from FIG. 14 to FIG. 15B that the camera lens group provided in example 5 may achieve good image quality.

EXAMPLE 6

Figure 16:
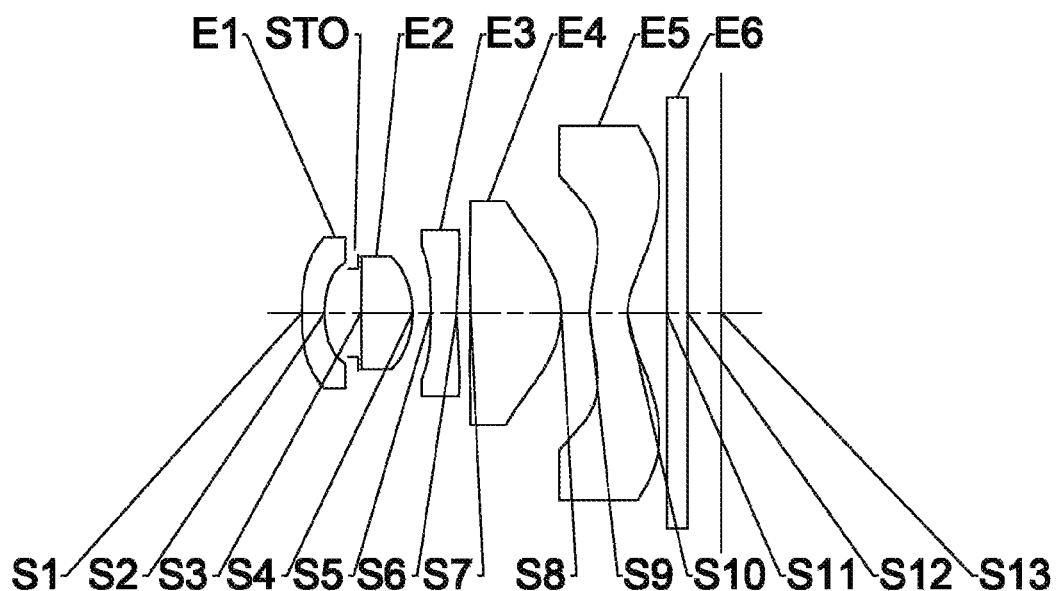
FIG. 16 illustrates a schematic structural view of a camera lens group according to example 6 of the present disclosure.

A camera lens group according to example 6 of the present disclosure is described below with reference to FIG. 16 to FIG. 18B. FIG. 16 shows a schematic structural view of the camera lens group according to example 6 of the present disclosure.

As shown in FIG. 16, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is concave, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 2.02 mm, a total length TTL of the camera lens group is 4.28 mm, half of a diagonal length ImgH of an effective pixel area on the imaging plane S13 of the camera lens group is 1.84 mm, half of a maximum field-of-view Semi-FOV of the camera lens group is 47.2°, and an aperture value Fno of the camera lens group is 2.22.

Table 16 is a table illustrating basic parameters of the camera lens group of example 6, wherein the units for the radius of curvature, the thickness/distance and the focal length in the first direction perpendicular to the optical axis are millimeter (mm). Table 17 shows high-order coefficients applicable to each rotationally symmetric aspheric surface in example 6, wherein the surface shape of each rotationally symmetric aspheric surface may be defined by the formula (1) given in the above example 1. Table 18-1 to Table 18-3 show Zernike polynomial coefficients applicable to non-rotationally symmetric aspheric surface in example 6, wherein the surface shape of non-rotationally symmetric aspheric surface may be defined by the formulas (2) and (3) given in the above example 1.

TABLE 16

| Surface number | Surface type | Radius of curvature | Thickness/ Distance | Material Refractive index | Abbe number | Focal length | Conic coefficient |
|---|---|---|---|---|---|---|---|
| OBJ | | Infinite | Infinite | | | | |
| S1 | Aspheric | 3.9820 | 0.2300 | 1.55 | 56.1 | −5.38 | 12.7456 |
| S2 | Aspheric | 1.6551 | 0.2988 | | | | 5.6020 |
| STO | | Infinite | 0.0362 | | | | |
| S3 | Aspheric | −20.0000 | 0.5392 | 1.55 | 56.1 | 1.97 | 63.6823 |
| S4 | Aspheric | −1.0282 | 0.1613 | | | | −0.6934 |
| S5 | Aspheric | 7.4887 | 0.2356 | 1.67 | 20.4 | −4.93 | −6.3829 |
| S6 | Aspheric | 2.2552 | 0.1382 | | | | 1.8747 |
| S7 | Aspheric | −7.7361 | 0.9819 | 1.54 | 55.9 | 1.85 | 59.2928 |
| S8 | Aspheric | −0.9191 | 0.3045 | | | | −0.8927 |
| S9(AAS) | Aspheric | 1.1487 | 0.3540 | 1.62 | 23.5 | −2.49 | −0.8056 |
| S10 | Aspheric | 0.6141 | 0.4229 | | | | −2.7766 |
| S11 | | Infinite | 0.2100 | 1.52 | 64.2 | | |
| S12 | | Infinite | 0.3674 | | | | |
| S13 | | Infinite | | | | | |

TABLE 17

| Surface number | A4 | A6 | A8 | A10 | A12 |
|---|---|---|---|---|---|
| S1 | 6.2385E−01 | −1.5131E+00 | 1.0314E+01 | −5.4073E+01 | 1.9174E+02 |
| S2 | 1.0907E+00 | −7.3326E+00 | 1.4120E+02 | −1.6481E+03 | 1.2275E+04 |
| S3 | −1.2595E−01 | 6.5025E−01 | −2.7822E+01 | 3.9606E+02 | −3.6908E+03 |
| S4 | −3.6343E−01 | −3.6925E−01 | 7.1386E+00 | −6.6792E+01 | 2.9165E+02 |
| S5 | −6.0787E−01 | −9.5607E−02 | 1.2527E+01 | −9.8348E+01 | 4.2628E+02 |
| S6 | −3.9772E−01 | −6.0042E−01 | 7.6792E+00 | −3.3856E+01 | 8.9315E+01 |
| S7 | 2.3711E−01 | −6.5868E−01 | 1.1301E+00 | 1.6837E+00 | −1.1425E+01 |
| S8 | 7.0863E−02 | 1.1673E−01 | −3.6658E−01 | 1.8954E−01 | 1.0582E+00 |
| S10 | −3.8848E−01 | 4.5513E−01 | −4.3593E−01 | 3.1060E−01 | −1.5769E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |
| S8 | −2.5356E+00 | 2.6005E+00 | −1.2818E+00 | 2.4294E−01 |
| S10 | 5.4347E−02 | −1.1964E−02 | 1.5100E−03 | −8.2811E−05 |

TABLE 18-1

| AAS SURFACE | C2 | C5 | C6 | C12 | C13 | C14 | C23 |
|---|---|---|---|---|---|---|---|
| S9 | −4.6854E−01 | 3.6575E−06 | −6.3891E−01 | 7.0198E−05 | 6.0657E−06 | −1.3837E−01 | 8.1597E−06 |

TABLE 18-2

| AAS SURFACE | C24 | C25 | C26 | C38 | C39 | C40 | C41 |
|---|---|---|---|---|---|---|---|
| S9 | 9.5054E−05 | 8.4281E−06 | 3.2579E−02 | 2.5720E−05 | 1.0384E−05 | 1.1665E−04 | 1.0724E−05 |

TABLE 18-3

| AAS SURFACE | C42 | C57 | C58 | C59 | C60 | C61 | C62 |
|---|---|---|---|---|---|---|---|
| S9 | 6.0759E−03 | 1.2106E−05 | 2.3824E−05 | 1.2524E−05 | 1.3404E−04 | 1.2934E−05 | 4.3367E−03 |

FIG. 17 illustrates sizes of RMS spot diameters of the camera lens group according to example 6 at positions with different image heights in a first quadrant. FIG. 17 illustrates a relationship between the RMS spot diameter and the real ray image height. In FIG. 17, each grid of the coordinate axis corresponds to 0.077 mm, the smallest RMS spot diameter is 0.0051027 mm, the largest RMS spot diameter is 0.030558 mm, the average RMS spot diameter is 0.0077201 mm, and the standard deviation of the RMS spot diameter is 0.0027982 mm. FIG. 18A illustrates astigmatic curves of the camera lens group according to example 6, representing the curvatures of a tangential plane and the curvatures of a sagittal plane. FIG. 18B illustrates a distortion curve of the camera lens group according to example 6, representing the amounts of distortion corresponding to different image heights. It can be seen from FIG. 17 to FIG. 18B that the camera lens group provided in example 6 may achieve good image quality.

EXAMPLE 7

Figure 19:
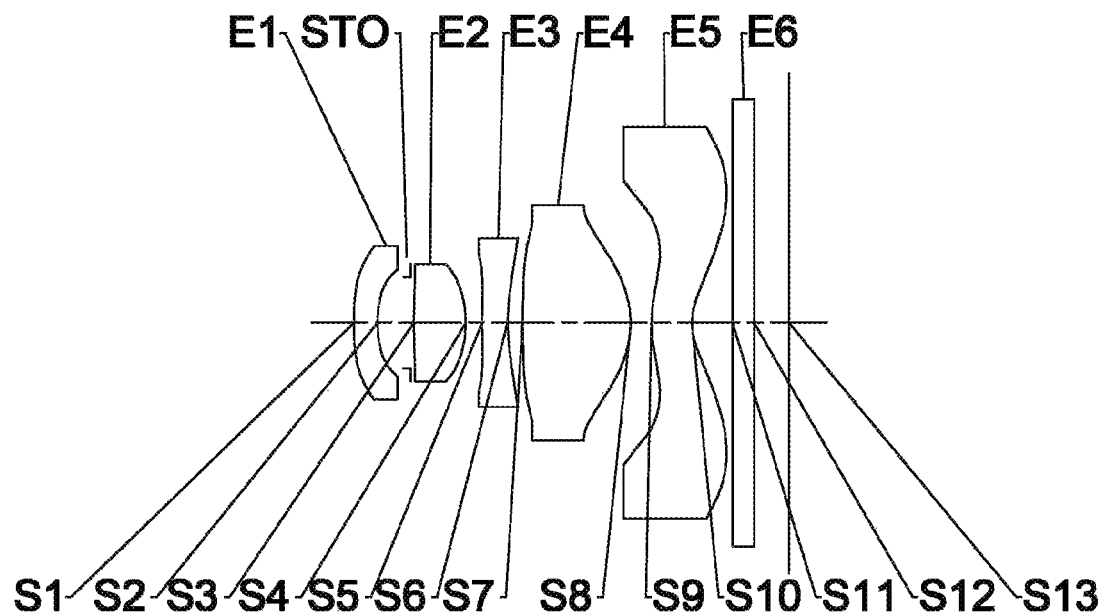
FIG. 19 illustrates a schematic structural view of a camera lens group according to example 7 of the present disclosure.

A camera lens group according to example 7 of the present disclosure is described below with reference to FIG. 19 to FIG. 21B. FIG. 19 shows a schematic structural view of the camera lens group according to example 7 of the present disclosure.

As shown in FIG. 19, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 2.03 mm, a total length TTL of the camera lens group is 4.24 mm, half of a diagonal length ImgH of an effective pixel area on the imaging plane S13 of the camera lens group is 1.84 mm, half of a maximum field-of-view Semi-FOV of the camera lens group is 47.0°, and an aperture value Fno of the camera lens group is 2.22.

Table 19 is a table illustrating basic parameters of the camera lens group of example 7, wherein the units for the radius of curvature, the thickness/distance and the focal length in the first direction perpendicular to the optical axis are millimeter (mm). Table 20 shows high-order coefficients applicable to each rotationally symmetric aspheric surface in example 7, wherein the surface shape of each rotationally symmetric aspheric surface may be defined by the formula (1) given in the above example 1. Table 21-1 to Table 21-3 show Zernike polynomial coefficients applicable to non-rotationally symmetric aspheric surface in example 7, wherein the surface shape of non-rotationally symmetric aspheric surface may be defined by the formulas (2) and (3) given in the above example 1.

TABLE 19

| Surface number | Surface type | Radius of curvature | Thickness/ Distance | Material | | Focal length | Conic coefficient |
|---|---|---|---|---|---|---|---|
| | | | | Refractive index | Abbe number | | |
| OBJ | | Infinite | Infinite | | | | |
| S1 | Aspheric | 3.2645 | 0.2300 | 1.55 | 56.1 | −4.34 | 15.7350 |
| S2 | Aspheric | 1.3380 | 0.3123 | | | | 2.2949 |
| STO | | Infinite | 0.0674 | | | | |

TABLE 19-continued

| Surface number | Surface type | Radius of curvature | Thickness/ Distance | Refractive index | Abbe number | Focal length | Conic coefficient |
|---|---|---|---|---|---|---|---|
| | | | | Material | | | |
| S3 | Aspheric | 6.2440 | 0.5176 | 1.55 | 56.1 | 2.87 | −1.3046 |
| S4 | Aspheric | −2.0320 | 0.1517 | | | | 3.5792 |
| S5 | Aspheric | 2.0875 | 0.2556 | 1.67 | 20.4 | 20.00 | −15.8435 |
| S6 | Aspheric | 2.3534 | 0.1858 | | | | 1.8885 |
| S7 | Aspheric | −7.1761 | 0.8975 | 1.54 | 55.9 | 1.65 | 52.6087 |
| S8 | Aspheric | −0.8207 | 0.0300 | | | | −1.0569 |
| S9 | Aspheric | 1.4187 | 0.4493 | 1.62 | 23.5 | −1.89 | −2.2561 |
| S10(AAS) | Aspheric | 0.6100 | 0.4931 | | | | −5.0892 |
| S11 | | Infinite | 0.2100 | 1.52 | 64.2 | | |
| S12 | | Infinite | 0.4375 | | | | |
| S13 | | Infinite | | | | | |

TABLE 20

| Surface number | A4 | A6 | A8 | A10 | A12 |
|---|---|---|---|---|---|
| S1 | 5.4230E−01 | −1.5656E+00 | 1.0296E+01 | −5.4399E+01 | 1.9174E+02 |
| S2 | 1.0658E+00 | −7.5265E+00 | 1.4326E+02 | −1.6565E+03 | 1.2275E+04 |
| S3 | −8.6836E−02 | 5.0146E−01 | −2.6684E+01 | 3.9490E+02 | −3.6908E+03 |
| S4 | −7.7575E−01 | 3.5572E−01 | 6.3400E+00 | −6.5830E+01 | 2.9165E+02 |
| S5 | −6.5769E−01 | −2.6411E−01 | 1.2565E+01 | −9.8178E+01 | 4.2628E+02 |
| S6 | −4.0689E−01 | −6.3691E−01 | 7.7122E+00 | −3.3814E+01 | 8.9315E+01 |
| S7 | 1.6982E−01 | −5.9480E−01 | 1.1358E+00 | 1.6276E+00 | −1.1398E+01 |
| S8 | 8.7148E−02 | 6.5591E−02 | −3.7162E−01 | 2.0652E−01 | 1.0729E+00 |
| S9 | −7.1324E−01 | 7.3165E−01 | −9.4870E−01 | 1.0534E+00 | −8.4028E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |
| S8 | −2.5320E+00 | 2.5848E+00 | −1.2818E+00 | 2.4294E−01 |
| S9 | 4.2419E−01 | −1.1762E−01 | 1.5777E−02 | −1.0236E−03 |

TABLE 21-1

| AAS SURFACE | C2 | C5 | C6 | C12 | C13 | C14 | C23 |
|---|---|---|---|---|---|---|---|
| S10 | −2.0376E−01 | 2.7244E−07 | −2.7605E−01 | 5.7478E−06 | 4.5338E−07 | −4.6918E−02 | 6.1303E−07 |

TABLE 21-2

| AAS SURFACE | C24 | C25 | C26 | C38 | C39 | C40 | C41 |
|---|---|---|---|---|---|---|---|
| S10 | 7.8699E−06 | 6.3318E−07 | 1.6021E−02 | 3.0758E−06 | 7.8547E−07 | 9.8044E−06 | 8.1125E−07 |

TABLE 21-3

| AAS SURFACE | C42 | C57 | C58 | C59 | C60 | C61 | C62 |
|---|---|---|---|---|---|---|---|
| S10 | −7.0935E−03 | 9.2375E−07 | 3.1917E−06 | 9.5556E−07 | 1.1484E−05 | 9.8683E−07 | 3.1269E−03 |

Figure 20:
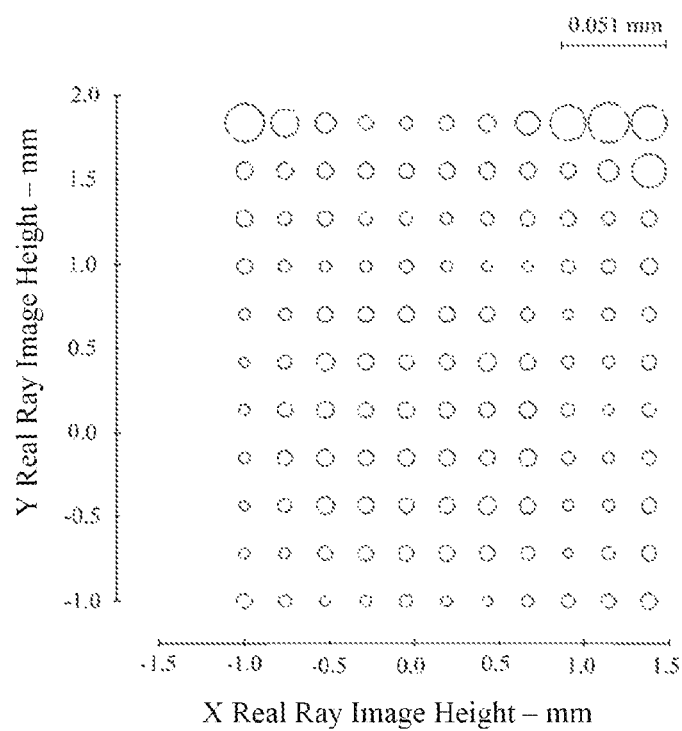
FIG. 20 schematically illustrates RMS spot diameters of the camera lens group according to example 7 of the present disclosure in a first quadrant.
Figures 21A, 21B:
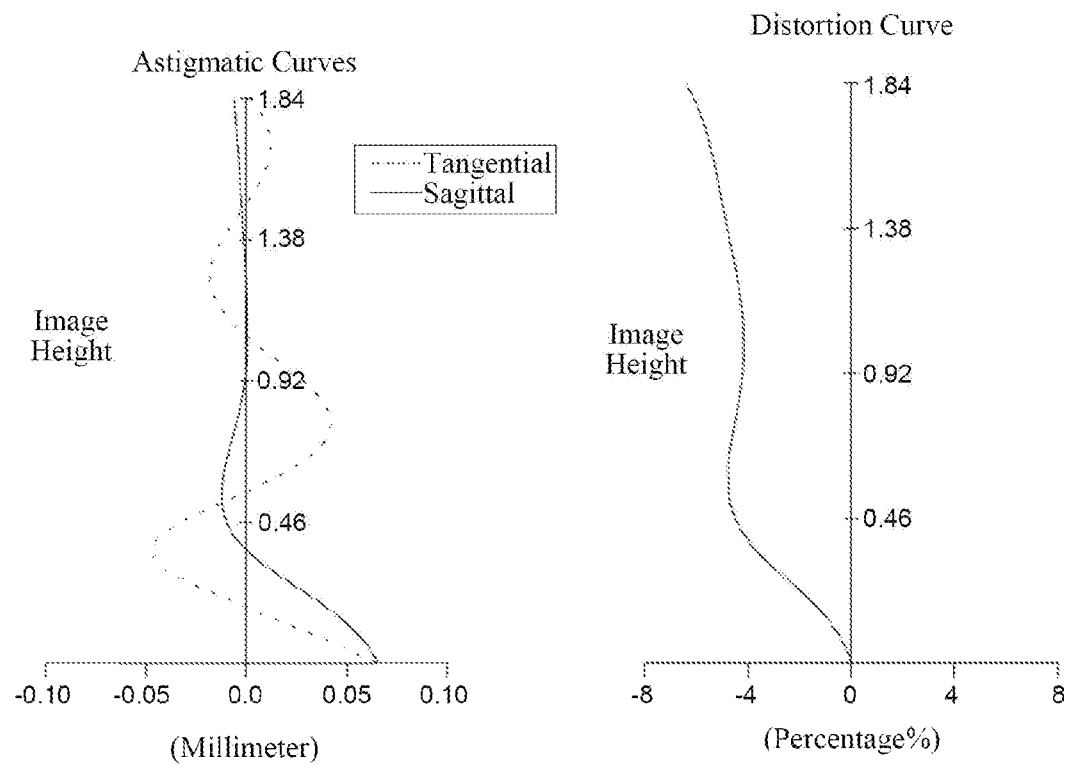
FIGS. 21A and 21B illustrate astigmatic curves and a distortion curve of the camera lens group according to example 7 of the present disclosure, respectively.

FIG. 20 illustrates the sizes of RMS spot diameters of the camera lens group according to example 7 at positions with different image heights in a first quadrant. FIG. 20 illustrates a relationship between the RMS spot diameter and the real ray image height. In FIG. 20, each grid of the coordinate axis corresponds to 0.051 mm, the smallest RMS spot diameter is 0.004786 mm, the largest RMS spot diameter is 0.020374 mm, the average RMS spot diameter is 0.0076098 mm, and the standard deviation of the RMS spot diameter is 0.0026287 mm FIG. 21A illustrates astigmatic curves of the camera lens group according to example 7, representing the curvatures of a tangential plane and the curvatures of a sagittal plane. FIG. 21B illustrates a distortion curve of the camera lens group according to example 7, representing the amounts of distortion corresponding to different image heights. It can be seen from FIG. 20 to FIG. 21B that the camera lens group provided in example 7 may achieve good image quality.

EXAMPLE 8

Figure 22:
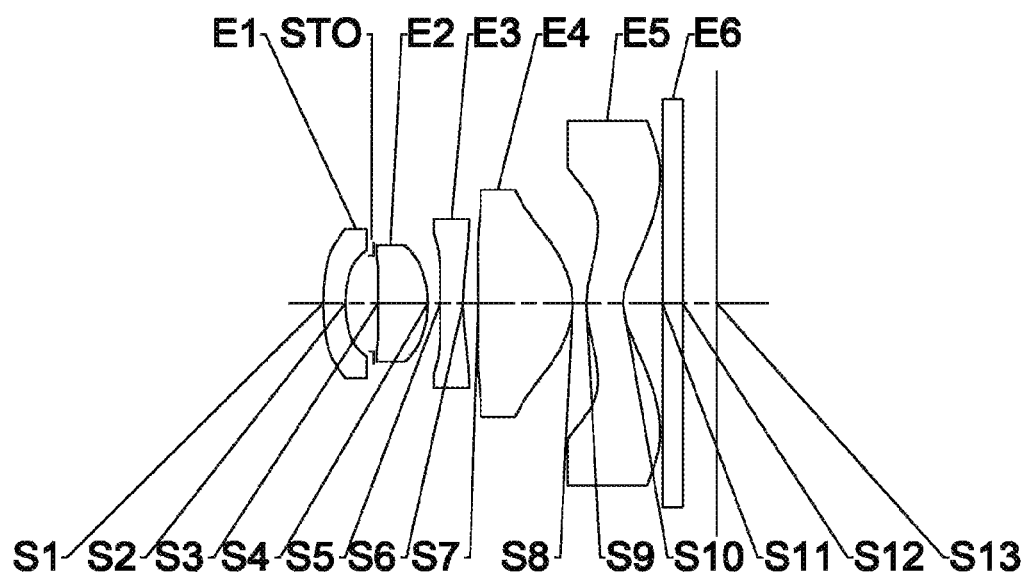
FIG. 22 illustrates a schematic structural view of a camera lens group according to example 8 of the present disclosure.

A camera lens group according to example 8 of the present disclosure is described below with reference to FIG. 22 to FIG. 24B. FIG. 22 shows a schematic structural view of the camera lens group according to example 8 of the present disclosure.

As shown in FIG. 22, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is concave, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.81 mm, a total length TTL of the camera lens group is 4.24 mm, half of a diagonal length ImgH of an effective pixel area on the imaging plane S13 of the camera lens group is 1.84 mm, half of a maximum field-of-view Semi-FOV of the camera lens group is 48.8°, and an aperture value Fno of the camera lens group is 2.22.

Table 22 is a table illustrating basic parameters of the camera lens group of example 8, wherein the units for the radius of curvature, the thickness/distance and the focal length in the first direction perpendicular to the optical axis are millimeter (mm). Table 23 shows high-order coefficients applicable to each rotationally symmetric aspheric surface in example 8, wherein the surface shape of each rotationally symmetric aspheric surface may be defined by the formula (1) given in the above example 1. Table 24-1 to Table 24-3 show Zernike polynomial coefficients applicable to non-rotationally symmetric aspheric surface in example 8, wherein the surface shape of non-rotationally symmetric aspheric surface may be defined by the formulas (2) and (3) given in the above example 1.

TABLE 22

| Surface number | Surface type | Radius of curvature | Thickness/ Distance | Material Refractive index | Material Abbe number | Focal length | Conic coefficient |
|---|---|---|---|---|---|---|---|
| OBJ | | Infinite | Infinite | | | | |
| S1 | Aspheric | 3.9016 | 0.2322 | 1.55 | 56.1 | −4.04 | 21.3341 |
| S2 | Aspheric | 1.3801 | 0.3360 | | | | 5.4799 |
| STO | Spherical | Infinite | 0.0300 | | | | |
| S3 | Aspheric | 7.4982 | 0.5232 | 1.55 | 56.1 | 1.66 | 45.4599 |
| S4 | Aspheric | −1.0052 | 0.1850 | | | | −0.7072 |
| S5 | Aspheric | −20.0000 | 0.2601 | 1.67 | 20.4 | −3.72 | 20.1108 |
| S6 | Aspheric | 2.8454 | 0.1416 | | | | 2.9661 |
| S7(AAS) | Aspheric | −7.5222 | 0.9166 | 1.54 | 55.9 | 1.73 | 0.0000 |
| S8(AAS) | Aspheric | −0.8745 | 0.2867 | | | | −0.4590 |
| S9 | Aspheric | 1.2300 | 0.3819 | 1.62 | 23.5 | −2.59 | −1.5268 |
| S10 | Aspheric | 0.6217 | 0.3959 | | | | −2.9810 |
| S11 | | Infinite | 0.2100 | 1.52 | 64.2 | | |
| S12 | | Infinite | 0.3404 | | | | |
| S13 | | Infinite | | | | | |

TABLE 23

| Surface number | A4 | A6 | A8 | A10 | A12 |
|---|---|---|---|---|---|
| S1 | 6.1420E−01 | −1.5900E+00 | 1.0292E+01 | −5.4282E+01 | 1.9174E+02 |
| S2 | 1.0562E+00 | −7.3970E+00 | 1.4080E+02 | −1.6499E+03 | 1.2275E+04 |
| S3 | −9.7567E−02 | 9.9789E−01 | −2.9539E+01 | 4.0410E+02 | −3.6908E+03 |
| S4 | −3.5309E−01 | −4.8209E−01 | 7.5446E+00 | −6.6788E+01 | 2.9165E+02 |
| S5 | −6.1686E−01 | −1.0885E−01 | 1.2524E+01 | −9.8165E+01 | 4.2628E+02 |
| S6 | −3.6435E−01 | −5.8206E−01 | 7.6848E+00 | −3.3877E+01 | 8.9315E+01 |
| S9 | −6.7677E−01 | 7.3695E−01 | −9.5304E−01 | 1.0491E+00 | −8.4252E−01 |
| S10 | −3.7922E−01 | 4.5373E−01 | −4.3554E−01 | 3.1053E−01 | −1.5771E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S9 | 4.2349E−01 | −1.1758E−01 | 1.6002E−02 | −9.0439E−04 |
| S10 | 5.4345E−02 | −1.1964E−02 | 1.5101E−03 | −8.2771E−05 |

TABLE 24-1

| AAS SURFACE | C2 | C5 | C6 | C12 | C13 | C14 | C23 |
|---|---|---|---|---|---|---|---|
| S7 | 2.2142E−02 | 7.2438E−07 | 3.0306E−02 | 1.2956E−05 | 1.2014E−06 | 6.8642E−03 | 1.6161E−06 |
| S8 | 1.4655E−01 | −1.1631E−06 | 2.4824E−01 | −1.6850E−05 | −1.8257E−06 | 1.3018E−01 | −2.2550E−06 |

TABLE 24-2

| AAS SURFACE | C24 | C25 | C26 | C38 | C39 | C40 | C41 |
|---|---|---|---|---|---|---|---|
| S7 | 1.7478E−05 | 1.6692E−06 | −1.8448E−03 | 3.1898E−06 | 2.0565E−06 | 2.1343E−05 | 2.1240E−06 |
| S8 | −2.0931E−05 | −2.3290E−06 | 3.7270E−02 | 1.4121E−07 | −2.5451E−06 | −2.2705E−05 | −2.6286E−06 |

TABLE 24-3

| AAS SURFACE | C42 | C57 | C58 | C59 | C60 | C61 | C62 |
|---|---|---|---|---|---|---|---|
| S7 | −1.1991E−03 | 2.3977E−06 | 2.4780E−06 | 2.4804E−06 | 2.4372E−05 | 2.5616E−06 | −6.6050E−04 |
| S8 | 9.7746E−03 | −2.5248E−06 | 1.3077E−06 | −2.6118E−06 | −2.1979E−05 | −2.6973E−06 | 8.1143E−04 |

FIG. 23 illustrates the sizes of RMS spot diameters of the camera lens group according to example 8 at positions with different image heights in a first quadrant. FIG. 23 illustrates a relationship between the RMS spot diameter and the real ray image height. In FIG. 23, each grid of the coordinate axis corresponds to 0.086 mm, the smallest RMS spot diameter is 0.0013976 mm, the largest RMS spot diameter is 0.034378 mm, the average RMS spot diameter is 0.0038442 mm, and the standard deviation of the RMS spot diameter is 0.0033033 mm. FIG. 24A illustrates astigmatic curves of the camera lens group according to example 8, representing the curvatures of a tangential plane and the curvatures of a sagittal plane. FIG. 24B illustrates a distortion curve of the camera lens group according to example 8, representing the amounts of distortion corresponding to different image heights. It can be seen from FIG. 23 to FIG. 24B that the camera lens group provided in example 8 may achieve good image quality.

EXAMPLE 9

Figure 25:
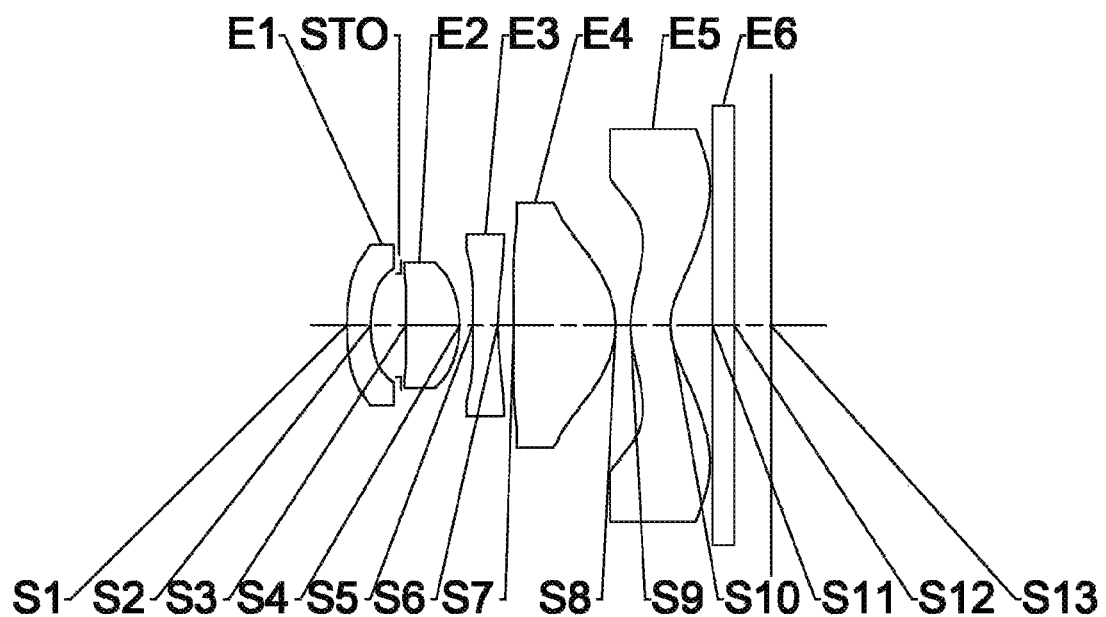
FIG. 25 illustrates a schematic structural view of a camera lens group according to example 9 of the present disclosure.

A camera lens group according to example 9 of the present disclosure is described below with reference to FIG. 25 to FIG. 27B. FIG. 25 shows a schematic structural view of the camera lens group according to example 9 of the present disclosure.

As shown in FIG. 25, the camera lens group includes a first lens E1, a stop STO, a second lens E2, a third lens E3, a fourth lens E4, a fifth lens E5, an optical filter E6 and an imaging plane S13, which are sequentially arranged from an object side to an image side.

The first lens E1 has negative refractive power, an object-side surface S1 thereof is convex, and an image-side surface S2 thereof is concave. The second lens E2 has positive refractive power, an object-side surface S3 thereof is convex, and an image-side surface S4 thereof is convex. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has negative refractive power, an object-side surface S9 thereof is convex, and an image-side surface S10 thereof is concave. The optical filter E6 has an object-side surface S11 and an image-side surface S12. Light from an object sequentially passes through the respective surfaces S1 to S12 and is finally imaged on the imaging plane S13.

In this example, a total effective focal length f of the camera lens group is 1.91 mm, a total length TTL of the camera lens group is 4.22 mm, half of a diagonal length ImgH of an effective pixel area on the imaging plane S13 of the camera lens group is 1.84 mm, half of a maximum field-of-view Semi-FOV of the camera lens group is 46.8°, and an aperture value Fno of the camera lens group is 2.22.

Table 25 is a table illustrating basic parameters of the camera lens group of example 9, wherein the units for the radius of curvature, the thickness/distance and the focal length in the first direction perpendicular to the optical axis are millimeter (mm). Table 26 shows high-order coefficients applicable to each rotationally symmetric aspheric surface in example 9, wherein the surface shape of each rotationally symmetric aspheric surface may be defined by the formula (1) given in the above example 1. Table 27-1 to Table 27-3 show Zernike polynomial coefficients applicable to non-rotationally symmetric aspheric surface in example 9, wherein the surface shape of non-rotationally symmetric aspheric surface may be defined by the formulas (2) and (3) given in the above example 1.

TABLE 25

| Surface number | Surface type | Radius of curvature | Thickness/ Distance | Material Refractive index | Abbe number | Focal length | Conic coefficient |
|---|---|---|---|---|---|---|---|
| OBJ | | Infinite | Infinite | | | | |
| S1 | Aspheric | 3.7940 | 0.2300 | 1.55 | 56.1 | −4.24 | 20.8239 |
| S2 | Aspheric | 1.4074 | 0.3219 | | | | 4.5171 |
| STO | Spherical | Infinite | 0.0300 | | | | |
| S3 | Aspheric | 6.1380 | 0.5032 | 1.55 | 56.1 | 1.87 | 11.6648 |
| S4 | Aspheric | −1.1898 | 0.1581 | | | | −0.4479 |
| S5 | Aspheric | 4.8132 | 0.2465 | 1.67 | 20.4 | −4.39 | 16.4511 |
| S6 | Aspheric | 1.7841 | 0.1455 | | | | 1.8485 |
| S7 | Aspheric | 20.0000 | 1.0500 | 1.54 | 55.9 | 1.68 | −99.0000 |
| S8 | Aspheric | −0.9266 | 0.1990 | | | | −1.0165 |
| S9 | Aspheric | 1.2164 | 0.3922 | 1.62 | 23.5 | −2.29 | −1.5603 |
| S10(AAS) | Aspheric | 0.6032 | 0.3924 | | | | −4.0706 |
| S11 | | Infinite | 0.2100 | 1.52 | 64.2 | | |
| S12 | | Infinite | 0.3369 | | | | |
| S13 | | Infinite | | | | | |

TABLE 26

| Surface number | A4 | A6 | A8 | A10 | A12 |
|---|---|---|---|---|---|
| S1 | 5.6514E−01 | −1.5583E+00 | 1.0259E+01 | −5.4338E+01 | 1.9174E+02 |
| S2 | 1.0151E+00 | −7.3260E+00 | 1.4106E+02 | −1.6512E+03 | 1.2275E+04 |
| S3 | −8.8040E−02 | 9.8741E−01 | −2.9427E+01 | 4.0363E+02 | −3.6908E+03 |
| S4 | −3.8170E−01 | −3.0932E−01 | 7.0412E+00 | −6.6299E+01 | 2.9165E+02 |
| S5 | −5.9679E−01 | −1.1577E−01 | 1.2608E+01 | −9.8561E+01 | 4.2628E+02 |
| S6 | −3.9057E−01 | −6.0232E−01 | 7.6510E+00 | −3.3893E+01 | 8.9315E+01 |
| S7 | 2.0798E−01 | −6.6067E−01 | 1.1342E+00 | 1.6735E+00 | −1.1436E+01 |
| S8 | 8.1463E−02 | 1.1549E−01 | −3.6962E−01 | 1.9217E−01 | 1.0612E+00 |
| S9 | −6.8277E−01 | 7.3755E−01 | −9.5113E−01 | 1.0499E+00 | −8.4232E−01 |

| Surface number | A14 | A16 | A18 | A20 |
|---|---|---|---|---|
| S1 | −4.3678E+02 | 6.1553E+02 | −4.8934E+02 | 1.6611E+02 |
| S2 | −5.7428E+04 | 1.6451E+05 | −2.6253E+05 | 1.7770E+05 |
| S3 | 2.1661E+04 | −7.9346E+04 | 1.6534E+05 | −1.5047E+05 |
| S4 | −7.3219E+02 | 8.9015E+02 | −1.2836E+02 | −5.5493E+02 |
| S5 | −1.1425E+03 | 1.8612E+03 | −1.6728E+03 | 6.3390E+02 |
| S6 | −1.5043E+02 | 1.5777E+02 | −9.3431E+01 | 2.3802E+01 |
| S7 | 2.3692E+01 | −2.5872E+01 | 1.4950E+01 | −3.6110E+00 |
| S8 | −2.5335E+00 | 2.6000E+00 | −1.2818E+00 | 2.4294E−01 |
| S9 | 4.2354E−01 | −1.1757E−01 | 1.5988E−02 | −9.1373E−04 |

TABLE 27-1

| AAS SURFACE | C2 | C5 | C6 | C12 | C13 | C14 | C23 |
|---|---|---|---|---|---|---|---|
| S10 | −3.9176E−01 | 1.4964E−05 | −5.1026E−01 | 1.8388E−04 | 1.9200E−05 | −7.1793E−02 | 1.7083E−05 |

TABLE 27-2

| AAS SURFACE | C24 | C25 | C26 | C38 | C39 | C40 | C41 |
|---|---|---|---|---|---|---|---|
| S10 | 1.6778E−04 | 1.7641E−05 | 4.6336E−02 | 1.0204E−05 | 1.1652E−05 | 1.1322E−04 | 1.2033E−05 |

TABLE 27-3

| AAS SURFACE | C42 | C57 | C58 | C59 | C60 | C61 | C62 |
|---|---|---|---|---|---|---|---|
| S10 | 1.4198E−02 | 5.1170E−06 | 3.7378E−06 | 5.2933E−06 | 5.0511E−05 | 5.4659E−06 | 1.4710E−02 |

Figure 26:
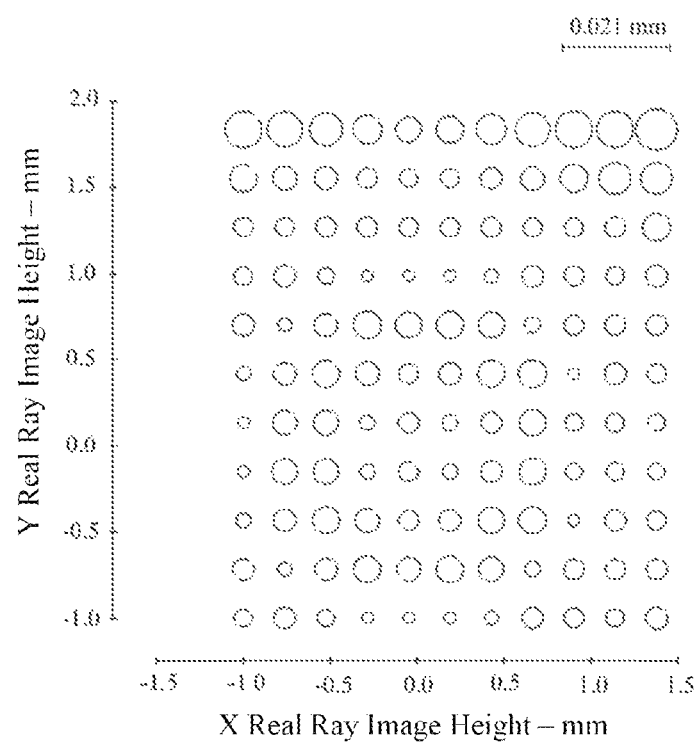
FIG. 26 schematically illustrates RMS spot diameters of the camera lens group according to example 9 of the present disclosure in a first quadrant.

FIG. 26 illustrates the sizes of RMS spot diameters of the camera lens group according to example 9 at positions with different image heights in a first quadrant. FIG. 26 illustrates a relationship between the RMS spot diameter and the real ray image height. In FIG. 26, each grid of the coordinate axis corresponds to 0.021 mm, the smallest RMS spot diameter is 0.0022724 mm, the largest RMS spot diameter is 0.0083888 mm, the average RMS spot diameter is 0.0043769 mm, and the standard deviation of the RMS spot diameter is 0.0012199 mm. FIG. 27A illustrates astigmatic curves of the camera lens group according to example 9, representing the curvatures of a tangential plane and the curvatures of a sagittal plane. FIG. 27B illustrates a distortion curve of the camera lens group according to example 9, representing the amounts of distortion corresponding to different image heights. It can be seen from FIG. 26 to FIG. 27B that the camera lens group provided in example 9 may achieve good image quality.

In view of the above, examples 1 to 9 respectively satisfy the relationship shown in Table 28.

TABLE 28

| Condition/Example | 1 | 2 | 3 | 4 | 5 | 6 | 7 | 8 | 9 |
|---|---|---|---|---|---|---|---|---|---|
| $\tan^2$(Semi-FOV)*f (mm) | 1.95 | 2.16 | 3.19 | 2.05 | 2.01 | 2.34 | 2.34 | 2.36 | 2.16 |
| f23/BFL | 4.93 | 4.35 | 2.62 | 6.01 | 2.39 | 2.93 | 2.14 | 2.70 | 2.94 |
| f12/f4 | 2.33 | 2.19 | 1.42 | 2.09 | 1.32 | 1.43 | 3.79 | 1.30 | 1.62 |
| f2/R9 | 2.23 | 1.64 | 1.94 | 2.94 | 1.81 | 1.71 | 2.02 | 1.35 | 1.54 |
| R6/R9 | 1.14 | 1.18 | 2.78 | 1.94 | 2.41 | 1.96 | 1.66 | 2.31 | 1.47 |
| CT4/T12 | 7.35 | 6.58 | 2.66 | 3.41 | 3.58 | 2.93 | 2.36 | 2.50 | 2.98 |
| SAG22/SAG51 | 1.75 | 1.73 | 2.14 | 1.56 | 2.99 | 0.96 | 1.03 | 0.77 | 0.83 |
| (ET4 + ET5)/(ET5 − ET4) | 1.86 | 4.68 | 2.42 | 2.88 | 4.61 | 3.41 | 2.04 | 2.77 | 4.17 |
| DT52/DT11 | 2.87 | 3.19 | 2.48 | 2.80 | 2.58 | 2.41 | 2.32 | 2.46 | 2.52 |
| (DT41 + DT42)/(DT42 − DT41) | 8.67 | 9.36 | 10.93 | 12.10 | 12.69 | 10.95 | 12.83 | 11.28 | 11.59 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device, such as a digital camera, or may be an imaging module integrated in a mobile electronic device, such as a mobile phone. The imaging apparatus is equipped with the camera lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens group, comprising: a first lens, a second lens, a third lens, a fourth lens and a fifth lens, which are sequentially arranged from an object side to an image side of the camera lens group along an optical axis,
wherein,
the first lens has negative refractive power, the second lens has positive refractive power, the fourth lens has positive refractive power, the fifth lens has negative refractive power, and the third lens has refractive power,
at least one of the first lens to the fifth lens has a non-rotationally symmetric aspheric surface, and
DT11<0.80 mm, where DT11 is a maximum effective radius of an object-side surface of the first lens;
wherein 1.35≤f2/R9<4.00,
where f2 is an effective focal length of the second lens, and R9 is a radius of curvature of an object-side surface of the fifth lens; and
wherein 1.42≤f12/f4<4.00,
where f12 is a combined focal length of the first lens and the second lens, and f4 is an effective focal length of the fourth lens.

2. The camera lens group according to claim 1, wherein 2.00<f23/BFL<6.50,
where f23 is a combined focal length of the second lens and the third lens, and BFL is a distance from an image-side surface of the fifth lens to an imaging plane of the camera lens group along the optical axis.

3. The camera lens group according to claim 1, wherein 0.50<R6/R9<3.00,
where R6 is a radius of curvature of an image-side surface of the third lens, and R9 is a radius of curvature of an object-side surface of the fifth lens.

4. The camera lens group according to claim 1, wherein 2.00<CT4/T12<8.00,
where CT4 is a center thickness of the fourth lens along the optical axis, and T12 is a spaced interval between the first lens and the second lens along the optical axis.

5. The camera lens group according to claim 1, wherein 0.50<SAG22/SAG51<3.00,
where SAG51 is a distance along the optical axis from an intersection of an object-side surface of the fifth lens and the optical axis to a point projected from a vertex of an effective radius of the object-side surface of the fifth lens onto the optical axis, and SAG22 is a distance along the optical axis from an intersection of an image-side surface of the second lens and the optical axis to a point projected from a vertex of an effective radius of the image-side surface of the second lens onto the optical axis.

6. The camera lens group according to claim 1, wherein 1.00< (ET4+ET5)/(ET5−ET4)<5.00,
where ET4 is an edge thickness of the fourth lens, and ET5 is an edge thickness of the fifth lens.

7. The camera lens group according to claim 1, wherein 2.00<DT52/DT11<4.00,
where DT52 is a maximum effective radius of an image-side surface of the fifth lens.

8. The camera lens group according to claim 1, wherein 8.00<(DT41+DT42)/(DT42−DT41)<13.00,
where DT41 is a maximum effective radius of an object-side surface of the fourth lens, and DT42 is a maximum effective radius of an image-side surface of the fourth lens.

9. The camera lens group according to claim 1, wherein 1.00 mm<tan$^2$(Semi-FOV)*f<4.00 mm,
where Semi-FOV is half of a maximum field-of-view of the camera lens group, and f is a total effective focal length of the camera lens group.

10. A camera lens group, comprising: a first lens, a second lens, a third lens, a fourth lens and a fifth lens, which are sequentially arranged from an object side to an image side of the camera lens group along an optical axis,
wherein,
the second lens has positive refractive power, the fourth lens has positive refractive power, the fifth lens has negative refractive power, and each of the first lens and the third lens has refractive power,
at least one of the first lens to the fifth lens has a non-rotationally symmetric aspheric surface, and
2.00<f23/BFL<6.50, where f23 is a combined focal length of the second lens and the third lens, and BFL is a distance from an image-side surface of the fifth lens to an imaging plane of the camera lens group along the optical axis;
wherein 1.35≤f2/R9<4.00,
where f2 is an effective focal length of the second lens, and R9 is a radius of curvature of an object-side surface of the fifth lens; and
wherein 1.42≤f12/f4<4.00,
where f12 is a combined focal length of the first lens and the second lens, and f4 is an effective focal length of the fourth lens; and
wherein 0.50<R6/R9<3.00,
where R6 is a radius of curvature of an image-side surface of the third lens, and R9 is a radius of curvature of an object-side surface of the fifth lens.

11. The camera lens group according to claim 10, wherein 2.00<CT4/T12<8.00,
where CT4 is a center thickness of the fourth lens along the optical axis, and T12 is a spaced interval between the first lens and the second lens along the optical axis.

12. The camera lens group according to claim 10, wherein 0.50<SAG22/SAG51<3.00,
where SAG51 is a distance along the optical axis from an intersection of an object-side surface of the fifth lens and the optical axis to a point projected from a vertex of an effective radius of the object-side surface of the fifth lens onto the optical axis, and SAG22 is a distance along the optical axis from an intersection of an image-side surface of the second lens and the optical axis to a point projected from a vertex of an effective radius of the image-side surface of the second lens onto the optical axis.

13. The camera lens group according to claim 10, wherein $1.00 < (ET4+ET5)/(ET5-ET4) < 5.00$, where ET4 is an edge thickness of the fourth lens, and ET5 is an edge thickness of the fifth lens.

14. The camera lens group according to claim 10, wherein $2.00 < DT52/DT11 < 4.00$, where DT11 is a maximum effective radius of an object-side surface of the first lens, and DT52 is a maximum effective radius of the image-side surface of the fifth lens.

15. The camera lens group according to claim 10, wherein $1.00 \text{ mm} < \tan^2(\text{Semi-FOV}) * f < 4.00 \text{ mm}$, where Semi-FOV is half of a maximum field-of-view of the camera lens group, and f is a total effective focal length of the camera lens group.

* * * * *